United States Patent
Wu et al.

(10) Patent No.: US 11,356,908 B2
(45) Date of Patent: Jun. 7, 2022

(54) SYSTEMS AND METHODS FOR A HANDOVER

(71) Applicant: CHONGQING UNIVERSITY OF POSTS AND TELECOMMUNICATIONS, Chongqing (CN)

(72) Inventors: Dapeng Wu, Chongqing (CN); Yaping Cui, Chongqing (CN); Ruyan Wang, Chongqing (CN); Feng Zhang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 101 days.

(21) Appl. No.: 17/007,001

(22) Filed: Aug. 31, 2020

(65) Prior Publication Data
US 2020/0396655 A1    Dec. 17, 2020

Related U.S. Application Data

(63) Continuation of application No. PCT/CN2018/112887, filed on Oct. 31, 2018.

(51) Int. Cl.
*H04W 4/00* (2018.01)
*H04W 36/00* (2009.01)
(Continued)

(52) U.S. Cl.
CPC ......... *H04W 36/0069* (2018.08); *H04W 4/44* (2018.02); *H04W 36/0058* (2018.08);
(Continued)

(58) Field of Classification Search
CPC ............... H04W 36/0069; H04W 4/44; H04W 36/0058; H04W 36/08; H04W 36/245;
(Continued)

(56) References Cited

U.S. PATENT DOCUMENTS 10,085,201 B2 * 9/2018 Ryu ....................... H04W 76/15
10,397,836 B2 * 8/2019 Park ................... H04W 36/0022
(Continued)

FOREIGN PATENT DOCUMENTS

| CN | 104684104 A | 6/2015 |
|----|-------------|--------|
| CN | 104936163 A | 9/2015 |

(Continued)

OTHER PUBLICATIONS

Qualcomm Incorporated, Handover Procedures for Dual Connectivity, 3GPP TSG-RAN WG3#83 R3-140288, 2014, 3 pages.
(Continued)

*Primary Examiner* — Amancio Gonzalez
(74) *Attorney, Agent, or Firm* — Metis IP LLC

(57) ABSTRACT

The present disclosure relates to systems and methods for a handover. The methods may include establishing a connection between a vehicle terminal and a first macro evolved Node B (MeNB) and a connection between the vehicle terminal and a secondary evolved Node B (SeNB), the vehicle terminal in a dual connectivity mode with the first MeNB and the SeNB; receiving, by the vehicle terminal, a handover command from the first MeNB; and disconnecting, based on the handover command, the vehicle terminal from the first MeNB and establishing synchronization between the vehicle terminal and a second MeNB, wherein the connection between the vehicle terminal and the SeNB is maintained. The SeNB is a secondary vehicle terminal meeting a preset condition or an SeNB installed at a fixed location.

20 Claims, 16 Drawing Sheets

(51) Int. Cl.
  H04W 76/34    (2018.01)
  H04W 4/44     (2018.01)
  H04W 76/15    (2018.01)
  H04W 36/08    (2009.01)
  H04W 36/24    (2009.01)
  H04W 36/30    (2009.01)
  H04W 36/32    (2009.01)
  H04W 36/38    (2009.01)
  H04W 56/00    (2009.01)

(52) U.S. Cl.
  CPC ......... *H04W 36/08* (2013.01); *H04W 36/245* (2013.01); *H04W 36/30* (2013.01); *H04W 36/32* (2013.01); *H04W 36/38* (2013.01); *H04W 56/001* (2013.01); *H04W 76/15* (2018.02); *H04W 76/34* (2018.02)

(58) Field of Classification Search
  CPC ..... H04W 36/30; H04W 36/32; H04W 36/38; H04W 56/001; H04W 76/15; H04W 76/34; H04W 4/40; H04W 16/32; H04W 36/28
  See application file for complete search history.

(56) References Cited

U.S. PATENT DOCUMENTS

| | | | | |
|---|---|---|---|---|
| 10,536,834 | B2* | 1/2020 | Yi | H04W 52/34 |
| 10,555,229 | B2* | 2/2020 | Hahn | H04B 17/382 |
| 10,616,940 | B2* | 4/2020 | Vutukuri | H04W 76/14 |
| 10,993,153 | B2* | 4/2021 | Teyeb | G01R 31/318342 |
| 11,129,067 | B2* | 9/2021 | Kim | H04W 36/00835 |
| 11,191,117 | B2* | 11/2021 | Vutukuri | H04W 4/70 |
| 11,212,717 | B2* | 12/2021 | Susitaival | H04W 36/08 |
| 2015/0189574 | A1* | 7/2015 | Ng | H04W 24/08 370/252 |
| 2016/0028585 | A1* | 1/2016 | Wager | H04W 76/15 455/452.2 |
| 2016/0337925 | A1 | 11/2016 | Fujishiro et al. | |
| 2017/0034866 | A1* | 2/2017 | Wager | H04W 76/27 |
| 2017/0055187 | A1 | 2/2017 | Kang et al. | |
| 2017/0208508 | A1 | 7/2017 | Laraqui | |
| 2018/0069606 | A1 | 3/2018 | Jung et al. | |

FOREIGN PATENT DOCUMENTS

| | | |
|---|---|---|
| EP | 3122119 A1 | 1/2017 |
| EP | 3361761 A1 | 8/2018 |
| WO | 2016122192 A1 | 8/2016 |

OTHER PUBLICATIONS

Xiaowen Li et al., Analysis and implementation of Handover Process of Dual Connectivity Technology based on Heterogeneous Networks, Study on Optical Communications, 2: 68-70, 2017.

Claudio Rosa et al., Dual Connectivity for LTE Small Cell Evolution: Functionality and Performance Aspects, IEEE Communications Magazine, 2016, 7 pages.

Small Cell Enhancements for E-UTRA and E-Utran, 3GPP, Technical Report TR36.B42, 2016, part 1, 32 pages.

Small Cell Enhancements for E-UTRA and E-UTRAN, 3GPP, Technical Report TR36.842, 2016, part 2, 10 pages.

Small Cell Enhancements for E-UTRA and E-UTRAN, 3GPP, Technical Report TR36.842, 2016, part 3, 11 pages.

Small Cell Enhancements for E-UTRA and E-Utran, 3GPP, Technical Report TR36.842, 2016, part 4, 17 pages.

Study on LTE-based V2X services, 3GPP, Technical Report TR36.885, 2016, part 1, 104 pages.

Study on LTE-based V2X services, 3GPP, Technical Report TR36.885, 2016, part 2, 113 pages.

Written Opinion in PCT/CN2018/112887 dated Jun. 27, 2019, 4 pages.

International Search Report in PCT/CN2018/112887 dated Jun. 27, 2019, 4 pages.

Lixin Man, The Load Balancing Research based on BP Neural Network Algorithm in SDN, 2017, 53 pages.

* cited by examiner

SYSTEMS AND METHODS FOR A HANDOVER

CROSS-REFERENCE TO RELATED APPLICATIONS

This application is a continuation of International Patent Application No. PCT/CN2018/112887, filed on Oct. 31, 2018, the entire contents of which are hereby incorporated by reference.

TECHNICAL FIELD

The present disclosure generally relates to the field of wireless communication technologies, and more specifically, to systems and methods for a handover.

BACKGROUND

Generally, in a vehicle-to-infrastructure (V2I) communication network, a vehicle may communicate with an infrastructure (e.g., a base station, a road side unit (RSU), etc.) deployed on the roadside using onboard communication devices (e.g., an on board unit (OBU), a mobile communication device, etc.) to ensure the smooth communication of information of the vehicle. Since the vehicle may be moving, the communication quality of the vehicle (e.g., the reliability of data transmission) may be affected when there is no infrastructure near the vehicle, or the infrastructure is not in a good condition. In this scenario, it is desirable to provide systems and methods for ensuring the communication quality of the vehicle.

SUMMARY

According to an aspect of the present disclosure, a system for a handover is provided. The system may include at least one storage device storing a set of instructions; and at least one processor in communication with the at least one storage device. When executing the set of instructions, the at least one processor may be configured to cause the system to establish a connection between a vehicle terminal and a first macro evolved Node B (MeNB) and a connection between the vehicle terminal and a secondary evolved Node B (SeNB), the vehicle terminal in a dual connectivity mode with the first MeNB and the SeNB; receive a handover command from the first MeNB; and disconnect, based on the handover command, the vehicle terminal from the first MeNB and establish synchronization between the vehicle terminal and a second MeNB, wherein the connection between the vehicle terminal and the SeNB is maintained. The SeNB may be a secondary vehicle terminal meeting a preset condition or an SeNB installed at a fixed location.

In some embodiments, the preset condition may include at least one of a distance between the secondary vehicle terminal and the vehicle terminal being not greater than a first preset threshold within a time interval; a relative speed between the secondary vehicle terminal and the vehicle terminal being within a speed range within a time interval; or an overlapping degree between a driving route of the secondary vehicle terminal and a driving route of the vehicle terminal being not less than a second preset threshold within a time interval.

In some embodiments, the at least one processor may be further configured to cause the system to determine, based on historical data of the vehicle terminal and historical data of the secondary vehicle terminal, the secondary vehicle terminal as the SeNB that may meets the preset condition.

In some embodiments, to receive the handover command from the first MeNB, the at least one processor may be further configured to cause the system to transmit a measurement report to the first MeNB, wherein the measurement report may include a strength of signals received by the vehicle terminal from the first MeNB and/or a strength of signals received by the vehicle terminal from the second MeNB; and the first MeNB may determine, based on the measurement report, that the vehicle terminal is moving from a first cell coverage area corresponding to the first MeNB to a second cell coverage area corresponding to the second MeNB, and may generate a handover decision; and receive the handover command from the first MeNB in response to the handover decision.

In some embodiments, to receive the handover command from the first MeNB, the at least one processor may be further configured to cause the system to receive the handover command in a radio resource control (RRC) message.

In some embodiments, the RRC message may include a first RRC connection reconfiguration message.

In some embodiments, the at least one processor may be further configured to cause the system to transmit, based on the first RRC connection reconfiguration message, a first RRC connection reconfiguration complete message to the second MeNB.

In some embodiments, the dual connectivity mode may include a split bearer mode or a non-split bearer mode.

In some embodiments, the dual connectivity mode may be based on a dual connectivity establishment process, and during the dual connectivity establishment process, the at least one processor may be further configured to cause the system to receive a second RRC connection reconfiguration message from the first MeNB, wherein the second RRC connection reconfiguration message may include configuration information of the first MeNB and/or configuration information of the SeNB; and determine, based on the second RRC connection reconfiguration message, that the dual connectivity mode is the split bearer mode or the non-split bearer mode.

According to another aspect of the present disclosure, a method for a handover is provided. The method may include establishing a connection between a vehicle terminal and a first macro evolved Node B (MeNB) and a connection between the vehicle terminal and a secondary evolved Node B (SeNB), the vehicle terminal in a dual connectivity mode with the first MeNB and the SeNB; receiving, by the vehicle terminal, a handover command from the first MeNB; and disconnecting, based on the handover command, the vehicle terminal from the first MeNB and establishing synchronization between the vehicle terminal and a second MeNB, wherein the connection between the vehicle terminal and the SeNB is maintained. The SeNB may be a secondary vehicle terminal meeting a preset condition or an SeNB installed at a fixed location.

According to another aspect of the present disclosure, a non-transitory computer readable medium is provided. The non-transitory computer readable medium may include a set of instructions. When executed by at least one processor, the set of instructions may direct the at least one processor to perform acts of establishing a connection between a vehicle terminal and a first macro evolved Node B (MeNB) and a connection between the vehicle terminal and a secondary evolved Node B (SeNB), the vehicle terminal in a dual connectivity mode with the first MeNB and the SeNB; receiving a handover command from the first MeNB; and disconnecting, based on the handover command, the vehicle terminal from the first MeNB and establishing synchronization between the vehicle terminal and a second MeNB, wherein the connection between the vehicle terminal and the SeNB is maintained. The SeNB may be a secondary vehicle terminal meeting a preset condition or an SeNB installed at a fixed location.

According to yet another aspect of the present disclosure, a system for a handover is provided. The system may include a radio transceiver and a processor. The radio transceiver may be configured to receive a handover command from a first macro evolved Node B (MeNB). The processor may be configured to establish a connection between a vehicle terminal and a first macro evolved Node B (MeNB) and a connection between the vehicle terminal and a secondary evolved Node B (SeNB), the vehicle terminal in a dual connectivity mode with the first MeNB and the SeNB; and disconnect, based on the handover command, the vehicle terminal from the first MeNB and establish synchronization between the vehicle terminal and a second MeNB, wherein the connection between the vehicle terminal and the SeNB is maintained. The SeNB may be a secondary vehicle terminal meeting a preset condition or an SeNB installed at a fixed location.

Additional features of the present disclosure will be set forth in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

In order to illustrate the technical solutions related to the embodiments of the present disclosure, brief introduction of the drawings referred to the description of the embodiments is provided below. Obviously, drawings described below are merely some examples or embodiments of the present disclosure. Those skilled in the art, without further creative efforts, may apply the present disclosure to other similar scenarios according to these drawings. Unless stated otherwise or obvious from the context, the same reference numeral in the drawings may refer to the same structure and operation.

DETAILED DESCRIPTION

Figure 1:
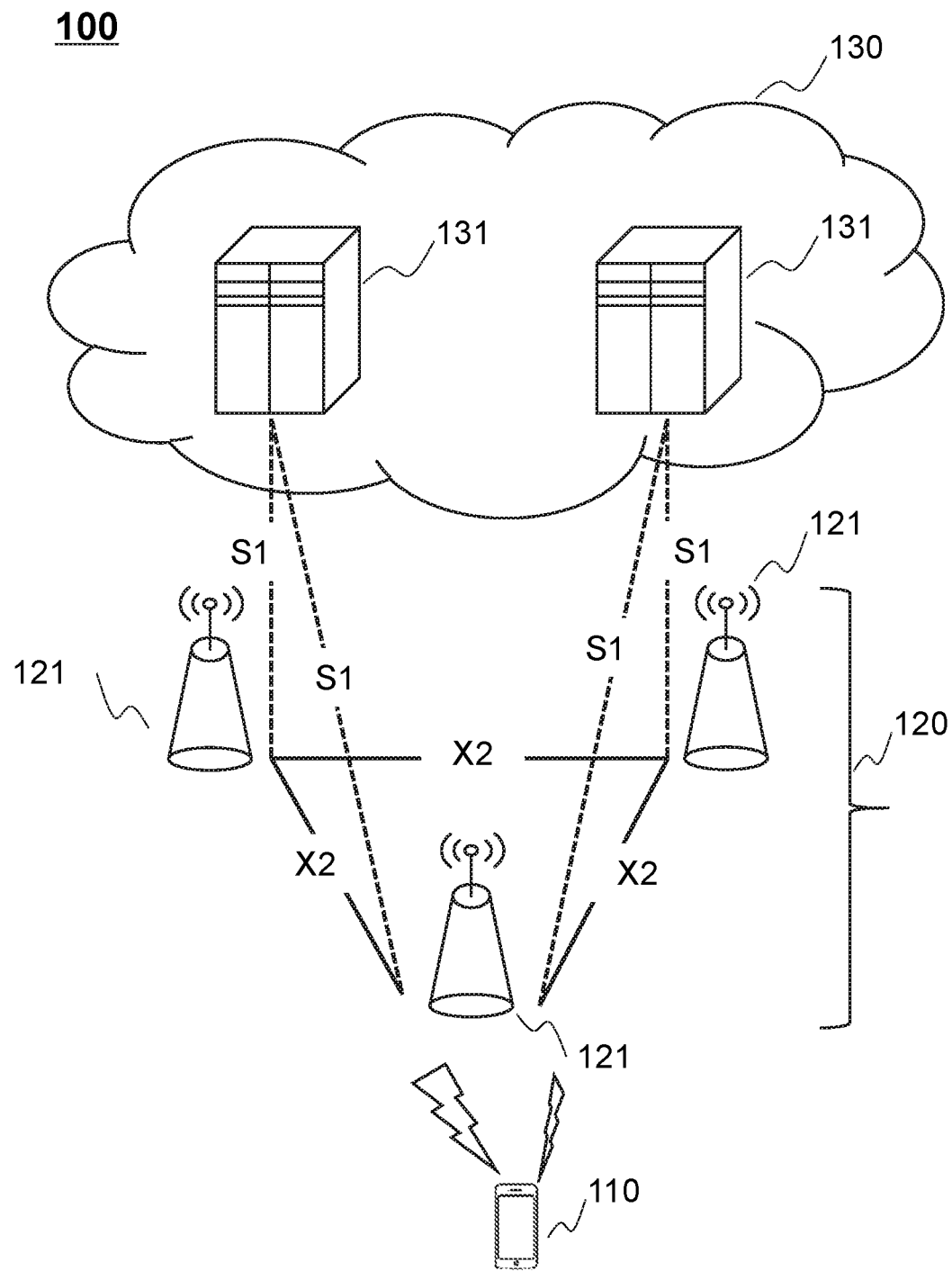
FIG. 1 is a schematic diagram illustrating an exemplary Long Term Evolution (LTE) system according to some embodiments of the present disclosure.

In order to illustrate the technical solutions related to the embodiments of the present disclosure, brief introduction of the drawings referred to the description of the embodiments is provided below. Obviously, drawings described below are only some illustrations or embodiments of the present disclosure. Those skilled in the art, without further creative effort, may apply the present teachings to other scenarios according to these drawings. Unless stated otherwise or obvious from the context, the same reference numeral in the drawings may refer to the same structure and operation.

It will be understood that the terms "system," "device," "unit," and/or "module" used herein are one method to distinguish different components, elements, parts, section or assembly of different levels. However, the terms can be replaced by other expressions if they achieve the same purpose.

It will be understood that when a device, unit or module is referred to as being "on," "connected to," or "coupled to," another device, unit or module, it may be directly on, connected to or coupled to or communicated with other device, unit or module, or an intervening device, unit or module may be present, unless the context clearly indicates otherwise. As used herein, the term "and/or" includes any and all combinations one or more of the associated listed items.

As used in the present disclosure and the appended claims, the singular forms "a," "an," and "the" may be intended to include plural referents, unless the content clearly indicates otherwise. It will be further understood that the terms "comprise," "comprising," "include," and/or "including" when used in the disclosure, specify the presence of stated steps and elements, but do not preclude the presence or addition of one or more other steps and elements.

Some modules of the system may be referred to in various ways according to some embodiments of the present disclosure. However, any number of different modules may be used and operated in a user terminal and/or a server. These modules are intended to be illustrative, and different modules may be used in different aspects of the system and method.

The flowcharts used in the present disclosure illustrate operations that systems implement according to some embodiments of the present disclosure. It will be understood that the operations of the flowcharts may be implemented not in order. Conversely, the operations may be performed in an inverted order, or simultaneously. Other operations may be added to the flowcharts, or one or more operations may be removed from the flowcharts.

For a better understanding of the present disclosure, the embodiments of the present disclosure may be described in the context of the 3rd Generation Partnership Project (3GPP) LTE/LTE-Advanced system. It should be noted that the technical features (or the scope of the claims) of the present disclosure are not limited to the specific system. For example, the systems and methods of the present disclosure may also be applied to other systems including, for example, the Global System for Mobile Communications (GSM), the General Packet Radio Service (GPRS) system, the 3rd Generation (3G) system, etc.

The present disclosure mainly describes data transmission and reception between a base station (BS) and a user terminal. A BS refers to a terminal node that directly communicates with a user terminal. Specific operations performed by the BS may be performed by an upper node of the BS. The terms "BS," "base station," "fixed station," "Node B," "eNode B," "eNB," "advanced base station," "access point," etc., may be used interchangeably. The terms "user terminal," "User Equipment (UE)," "Mobile Station (MS)," "Subscriber Station (SS)," "Mobile Subscriber Station (MSS)," "Mobile Terminal," "vehicle terminal," "Advanced Mobile Station (AMS)," etc., may be used interchangeably.

As used herein, the term "cell" refers to the coverage of a base station (e.g., a specific frequency range or a specific geographical area). For brevity, the term "cell" may cover the concept of a base station. For example, a macro base station (or referred to as a master base station) may have the same meaning as a macro cell (or referred to as a master cell), and a small base station (or referred to as a secondary base station) may have the same meaning as a small cell (or a secondary cell). However, when a cell needs to be explicitly distinguished from a base station, the term "cell" has its original meaning. The term "bearer" may refer to a transmission channel for signaling and/or data.

In the present disclosure, a connection between a communication device and other communication devices (e.g., a connection between a user terminal and a base station, a connection between the user terminal and other user terminals, a connection between the base station and other base stations, etc.) refers to the communication (e.g., wired communication, wireless communication) between the communication device and the other communication devices, and is not limited to a direct physical connection.

An aspect of the present disclosure relates to systems and methods for a handover. Generally, a vehicle terminal (also referred to as a vehicle) may establish connections with a macro eNB (MeNB) and a secondary eNB (SeNB) installed at fixed locations, respectively. The vehicle terminal may be in a dual connectivity mode with the MeNB and the SeNB. With the systems and the methods disclosed in the present disclosure, when there is no SeNB installed at any fixed location near the vehicle terminal, a secondary vehicle terminal (also referred to as a secondary vehicle) near the vehicle terminal may be used as an SeNB. The vehicle terminal may be in a dual connectivity mode with the MeNB and the secondary vehicle terminal, thus ensuring the communication quality of the vehicle terminal. The secondary vehicle terminal may need to meet a preset condition. The preset condition may be associated with a distance and/or a relative speed between the vehicle terminal and the secondary vehicle terminal, a driving route of the vehicle terminal and a driving route of the secondary vehicle terminal, etc. Further, during an MeNB handover of the vehicle terminal, the vehicle terminal may maintain the connection with the secondary vehicle terminal, thus achieving a seamless handover.

FIG. 1 is a schematic diagram illustrating an exemplary LTE system 100 according to some embodiments of the present disclosure. As shown in FIG. 1, the LTE system 100 may include a user terminal 110, an evolved universal mobile telecommunications system (UMTS) terrestrial radio access network (E-UTRAN) 120, and an evolved packet core (EPC) 130.

The user terminal 110 may be a mobile communication device that performs wireless communication with a cell (or a base station corresponding to the cell). In some embodiments, the user terminal 110 may include a mobile phone, a tablet computer, a laptop, a built-in device of a vehicle (also referred to as a vehicle terminal), or the like, or any combination thereof. In some embodiments, the built-in device of the vehicle may include an onboard computer, an onboard television, an OBU, a mobile device (e.g., a mobile phone) inside the vehicle, etc.

The E-UTRAN 120 may correspond to a radio access network. The E-UTRAN 120 may include a plurality of eNBs 121. The plurality of eNBs 121 may be connected to each other via X2 interfaces. An eNB 121 may correspond to a cell. In some embodiments, the cell may include one or more sectors (e.g., three sectors, six sectors, etc.). The eNB 121 may establish a wireless communication connection with the user terminal 110. The eNB 121 may have a radio resource management (RRM) function, a user data routing function, a measurement control function for mobility control and scheduling, etc. In some embodiments, the eNB 121 may include an MeNB or an SeNB. The MeNB may correspond to a macro cell (or referred to as a master cell), and the SeNB may correspond to a secondary cell (or referred to as a small cell). The SeNB may be located in a coverage area of the macro cell, and the secondary cell may have a coverage area overlapping at least a part of the coverage area of the macro cell.

The EPC 130 may include a plurality of mobility management entities (MMEs)/Serving Gateways (S-GWs) 131. The plurality of MMEs/S-GWs 131 may be located at the end of the network, so as to be connected to an external network. An MME and an S-GW may be network elements of the EPC 130. The MME may perform functions of a control plane (e.g., signaling processing). The S-GW may perform functions of a user plane (e.g., data routing). An MME/S-GW 131 may be connected to the eNB 121 via an S1 interface. In some embodiments, the EPC 130 may also include a packet data network (PDN) gateway (P-GW). The P-GW may provide a connection from the user terminal 110 to an external PDN.

Figure 2:
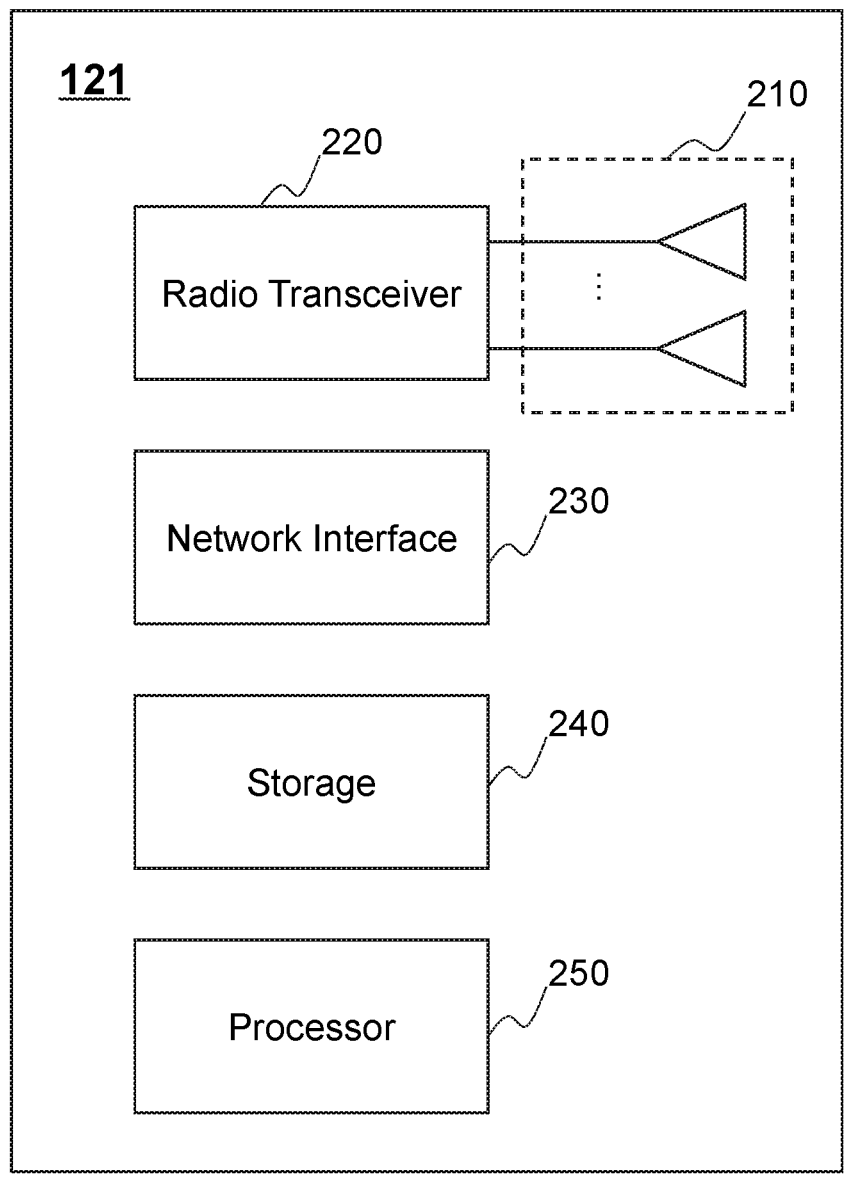
FIG. 2 is a block diagram illustrating an exemplary evolved Node B (eNB) according to some embodiments of the present disclosure.

FIG. 2 is a block diagram illustrating an exemplary eNB 121 according to some embodiments of the present disclosure. As shown in FIG. 2, the eNB 121 may include one or more antennas 210, a radio transceiver 220, a network interface 230, a storage 240, and a processor 250.

The one or more antennas 210 and the radio transceiver 220 may be configured to allow transmission and reception of data (and/or instructions) between the eNB 121 and other communication devices (e.g., the user terminal 110). For example, the radio transceiver 220 may convert a baseband signal output from the processor 250 into a radio signal and transmit the radio signal to the one or more antennas 210. The one or more antennas 210 may transmit the radio signal to other communication devices. As another example, the one or more antennas 210 may receive a radio signal from other communication devices and transmit the radio signal to the radio transceiver 220. The radio transceiver 220 may convert the received radio signal into a baseband signal and transmit the baseband signal to the processor 250.

The network interface 230 may be an interface for connecting the eNB 121 to other devices. For example, the network interface 230 may be connected to an adjacent eNB via an X2 interface. As another example, the network interface 230 may be connected to the MME/S-GW 131 via an S1 interface.

The storage 240 may be configured to store data and/or information. For example, the storage 240 may store programs or instructions for the processor 250. When executing the programs or the instructions, the processor 250 may perform one or more functions or operations described in the present disclosure. In some embodiments, the storage 240 may include a hard disk drive, a solid state disk, a removable storage drive (e.g., a flash memory disk, an optical disk drive), or the like, or any combination thereof.

The processor 250 may be configured to process data and/or information.

For example, the processor 250 may perform modulation/demodulation, encoding/decoding, etc., on the baseband signal. As another example, the processor 250 may execute programs or instructions stored in the storage 240 to implement some embodiments of the present disclosure. Merely by way of example, the processor 250 may include a central processing unit (CPU), an application specific integrated circuit (ASIC), an application specific instruction set processor (ASIP), a graphic processing unit (GPU), a physical processing unit (PPU), a digital signal processor (DSP), a field programmable gate array (FPGA), a programmable logic device (PLD), a controller, a microcontroller unit, a reduced instruction set computer (RISC), a microprocessor, or the like, or any combination thereof.

In some embodiments, the processor 250 and the storage 240 may constitute a control unit. In some embodiments, the storage 240 may be integrated into the processor 250.

Figure 3:
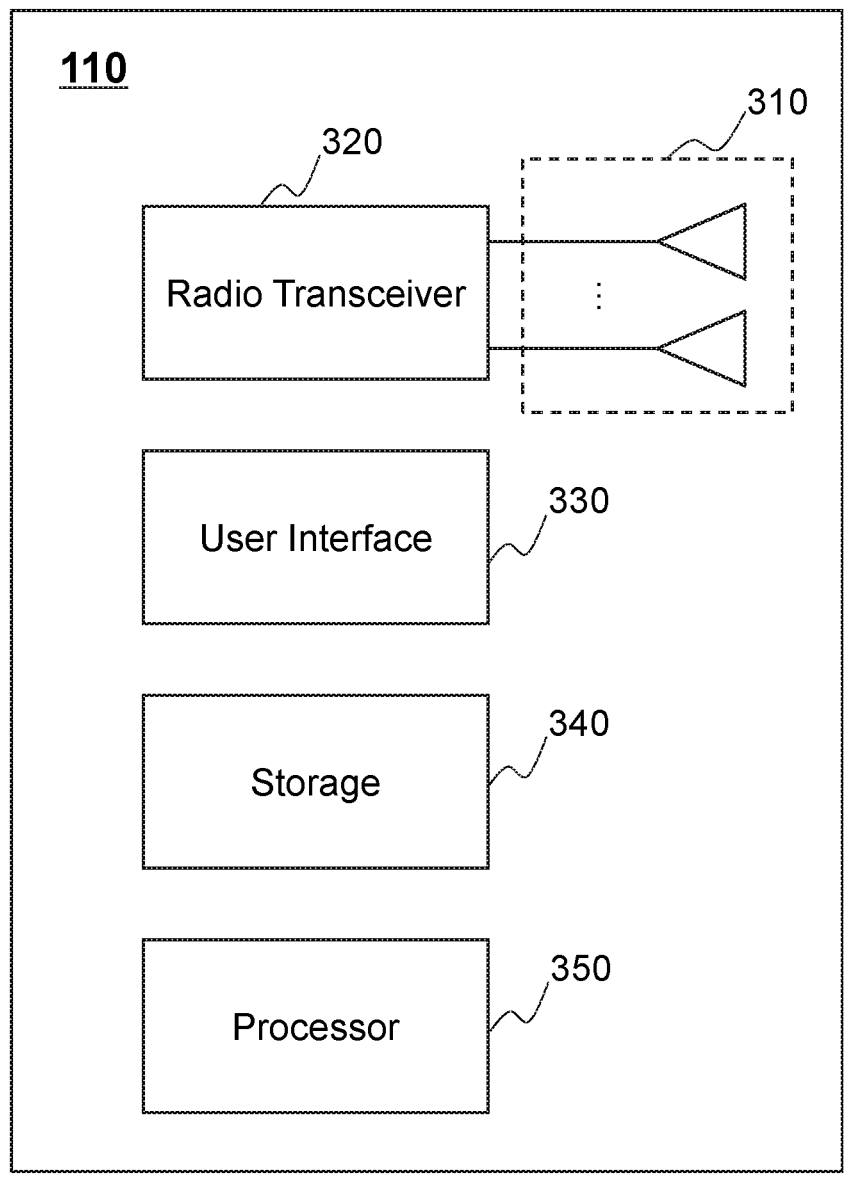
FIG. 3 is a block diagram illustrating an exemplary user terminal according to some embodiments of the present disclosure.

FIG. 3 is a block diagram illustrating an exemplary user terminal 110 according to some embodiments of the present disclosure. As shown in FIG. 3, the user terminal 110 may include one or more antennas 310, a radio transceiver 320, a user interface 330, a storage 340, and a processor 350.

The one or more antennas 310 and the radio transceiver 320 may be configured to allow transmission and reception of data (and/or instructions) between the user terminal 110 and other communication devices (e.g., the eNB 121). For example, the radio transceiver 320 may convert a baseband signal output from the processor 350 into a radio signal and transmit the radio signal to the one or more antennas 310. The one or more antennas 310 may transmit the radio signal to other communication devices. As another example, the one or more antennas 310 may receive a radio signal from other communication devices and transmit the radio signal to the radio transceiver 320. The radio transceiver 320 may convert the received radio signal into a baseband signal and transmit the baseband signal to the processor 350.

The user interface 330 may be an interface that facilitates the interaction between a user and the user terminal 110. For example, the user interface 330 may receive an operation instruction from the user and output a signal related to the operation instruction to the processor 350. Merely by way of example, the user interface 330 may include, for example, a display, a microphone, a speaker, a touch screen, various buttons, etc.

The storage 340 may store data and/or information. For example, the storage 340 may store programs or instructions for the processor 350. When executing the programs or the instructions, the processor 350 may perform one or more functions or operations described in the present disclosure. In some embodiments, the storage 340 may include a hard disk drive, a solid state disk, a removable storage drive (e.g., a flash memory disk, an optical disk drive), or the like, or any combination thereof.

The processor 350 may be configured to process data and/or information. For example, the processor 350 may perform modulation/demodulation, encoding/decoding, etc., on the baseband signal. As another example, the processor 350 may execute programs or instructions stored in the processor 350 to implement some embodiments of the present disclosure. Merely by way of example, the processor 350 may include a CPU, an ASIC, an ASIP, a GPU, a PPU, a DSP, an FPGA, a PLD, a controller, a microcontroller unit, a RISC, a microprocessor, or the like, or any combination thereof.

In some embodiments, the processor 350 and the storage 340 may constitute a control unit. In some embodiments, the storage 340 may be integrated into the processor 350.

Figure 4:
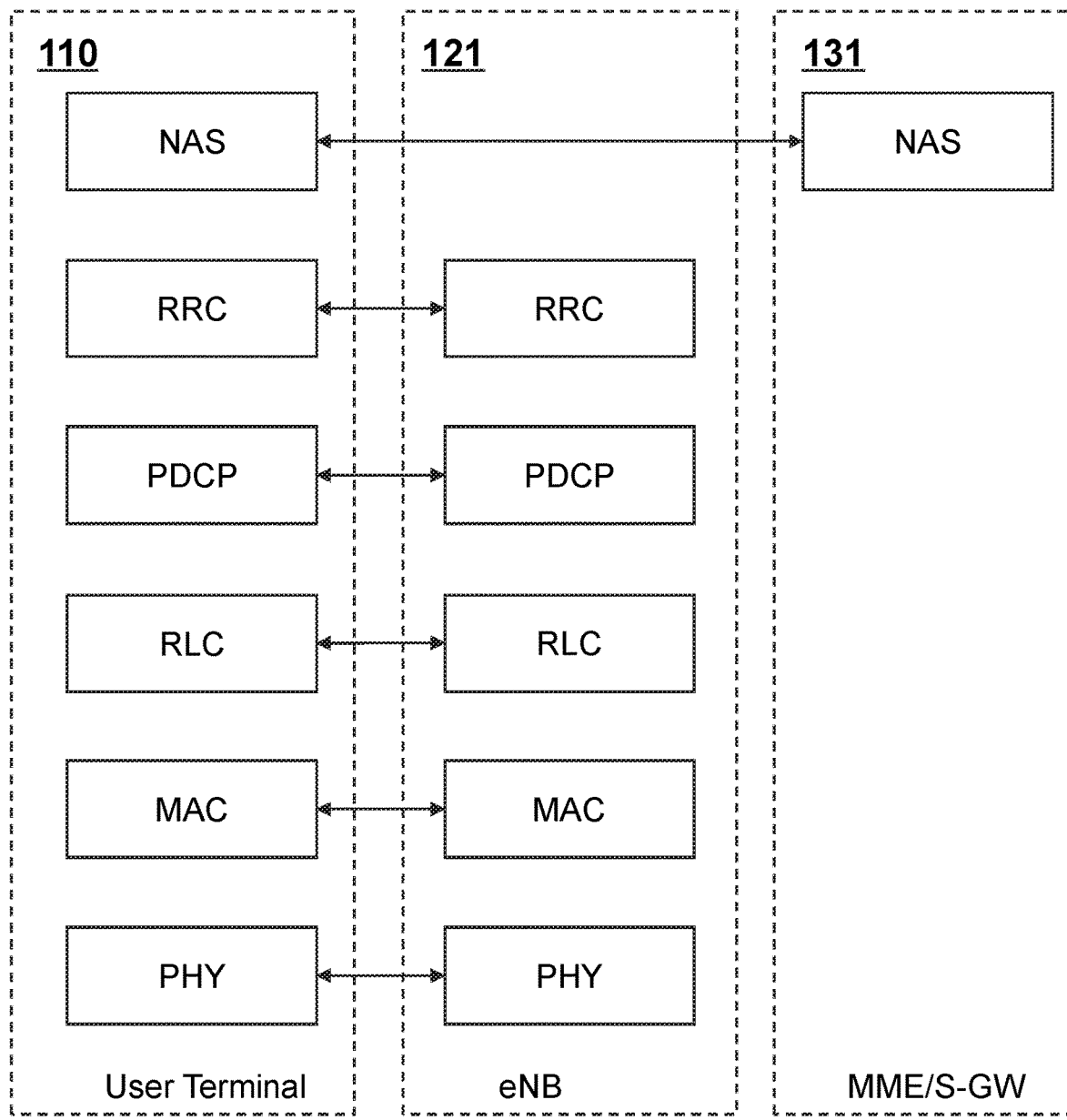
FIG. 4 is a schematic diagram illustrating a protocol stack of a wireless interface in the LTE system according to some embodiments of the present disclosure.

FIG. 4 is a schematic diagram illustrating a protocol stack of a wireless interface in the LTE system according to some embodiments of the present disclosure. As illustrated in FIG. 4, a radio interface protocol may be divided into a first layer, a second layer, and a third layer based on an open system interconnection (OSI) reference model. The first layer is a physical (PHY) layer. The second layer includes a media access control (MAC) layer, a radio link control (RLC) layer, and a packet data convergence protocol (PDCP) layer. The third layer includes a radio resource control (RRC) layer.

The PHY layer may provide an information transfer service to an upper layer (e.g., the MAC layer) via a physical channel. Between the PHY layer of the user terminal 110 and the PHY layer of the eNB 121, data (and/or control signals) may be transmitted via a physical channel.

The MAC layer may provide services to the RLC layer via a logical channel. Between the MAC layer of the user terminal 110 and the MAC layer of the eNB 121, data (and/or control signals) may be transmitted via a transmission channel.

The RLC layer may support reliable data transfer. Between the RLC layer of the user terminal 110 and the RLC layer of the eNB 121, data (and/or control signals) may be transmitted via a logical channel.

The PDCP layer may perform header compression/decompression, encoding/decoding, etc.

The RRC layer is defined only by a control plane. Between the RRC layer of the user terminal 110 and the RRC layer of the eNB 121, control signals (e.g., RRC messages) for various configurations may be transmitted. The RRC layer may control a logical channel, a transmission channel, and a physical channel associated with configuration (or establishment), reconfiguration (or reestablishment) and release of a radio bearer.

A non-access stratum (NAS) layer may be located above the RRC layer. The NAS layer may perform session management and mobility management.

Figure 5:
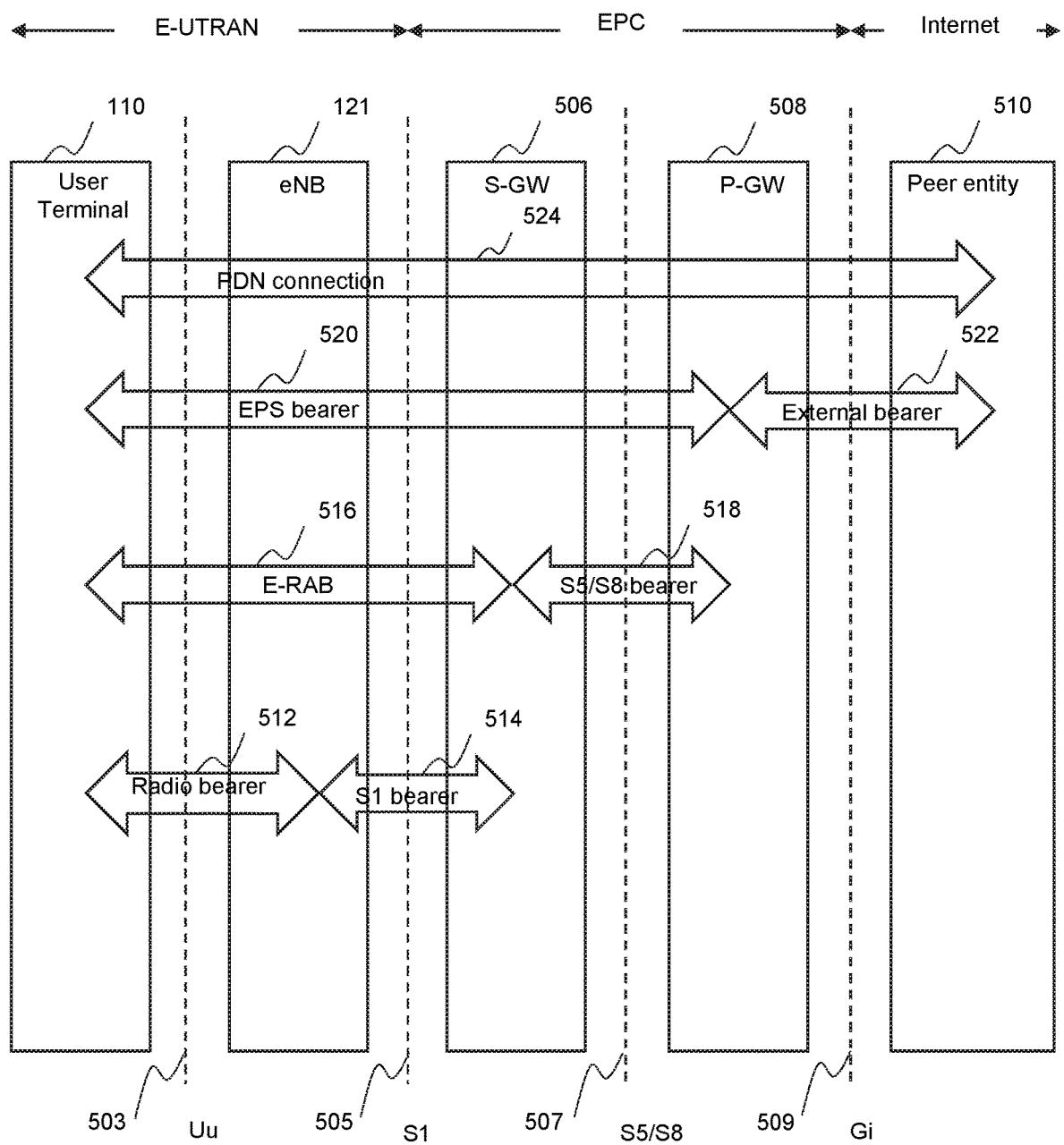
FIG. 5 is a schematic diagram illustrating a bearer architecture in a wireless communication system according to some embodiments of the present disclosure.

FIG. 5 is a schematic diagram illustrating a bearer architecture in a wireless communication system according to some embodiments of the present disclosure. As shown in FIG. 5, when the user terminal 110 is connected to a PDN (e.g., a peer entity 510 illustrated in FIG. 5), a PDN connection 524 may be formed. The PDN connection 524 may also be referred to as an evolved packet system (EPS) session. The PDN connection 524 may include one or more EPS bearers 520 and one or more external bearers 522. An EPS bearer 520 may be a transmission channel for data transmission between the user terminal 110 and a P-GW 508. An external bearer 522 may be a transmission channel for data transmission between the P-GW 508 and the peer entity 510. The user terminal 110 may correspond to one or more EPS bearers 520 and one or more external bearers 522.

The EPS bearer 520 may be divided into an evolved radio access bearer (E-RAB) 516 and an S5/S8 bearer 518. The E-RAB 516 may be divided into a radio bearer 512 and an S1 bearer 514. The E-RAB 516 may be used to transmit a packet of the EPS bearer 520 between the user terminal 110 and an EPC (e.g., the S-GW 506 illustrated in FIG. 5). The S5/S8 bearer 518 may be used to transmit a packet of the EPS bearer 520 between the S-GW 506 and the P-GW 508. The radio bearer 512 may be used to transmit a packet of the EPS bearer 520 between the user terminal 110 and the eNB 121. The S1 bearer may be used to transmit a packet of the EPS bearer 520 between the eNB 121 and the S-GW 506. The eNB 121 may be an MeNB or an SeNB. An X2 bearer may be generated between the MeNB and the SeNB. The X2 bearer may be a transmission channel for data transmission between the MeNB and the SeNB.

The user terminal 110 and the eNB 121 may be connected to or communicate with each other via a Uu interface 503. The eNB 121 and the S-GW 506 may be connected to or communicate with each other via an S1 interface 505. The S-GW 506 and the P-GW 508 may be connected to or communicate with each other via an S5/S8 interface 507. The P-GW 508 and the peer entity 510 may be connected to or communicate with each other via a Gi interface.

Figure 6:
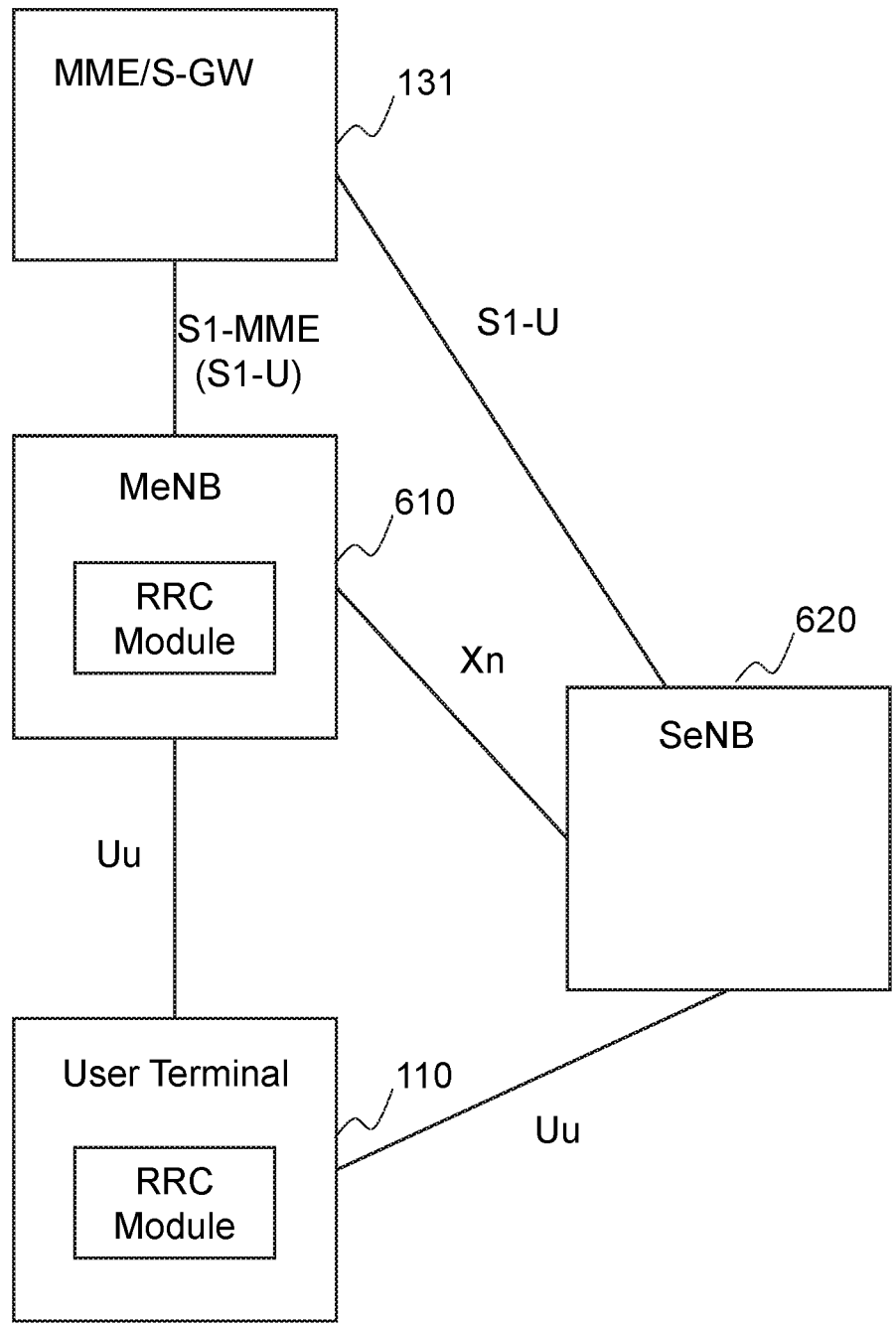
FIG. 6 is a schematic diagram illustrating a dual connectivity mode according to some embodiments of the present disclosure.

FIG. 6 is a schematic diagram illustrating a dual connectivity mode according to some embodiments of the present disclosure. As illustrated in FIG. 6, the user terminal 110 may be in a dual connectivity mode with an MeNB 610 and an SeNB 620. The MeNB 610 and the SeNB 620 may be examples (or embodiments) of the eNB 121 (as illustrated in FIG. 1). In the dual connectivity mode, only the MeNB 610 (including an RRC module) may establish an RRC connection with the user terminal 110 (including an RRC module), and the SeNB 620 does not establish an RRC connection with the user terminal 110. The MeNB 610 may establish a user plane connection and a control plane connection with the user terminal 110. Data and signaling (e.g., control signals) between the MeNB 610 and the user terminal 110 may be transmitted via a Uu interface. The SeNB 620 may establish a user plane connection with the user terminal 110, and the SeNB 620 does not establish a control plane connection with the user terminal 110. Data between the SeNB 620 and the user terminal 110 may be transmitted via a Uu interface. The MeNB 610 may establish a control plane connection and a user plane connection with the MME/S-GW 131. Signaling between the MME/S-GW 131 (e.g., the MME in the MME/S-GW 131) and the MeNB 610 may be transmitted via an S1-MME interface. Data between the MME/S-GW 131 (e.g., the S-GW in the MME/S-GW 131) and the MeNB 610 may be transmitted via an S1-U interface. The SeNB 620 may establish a user plane connection with the MME/S-GW 131. Data between the MME/S-GW 131 (e.g., the S-GW in the MME/S-GW 131) and the SeNB 620 may be transmitted via an S1-U interface. The MeNB 610 may establish a user plane connection and a control plane connection with the SeNB 620. Data between the MeNB 610 and the SeNB 620 may be transmitted via an Xn-U interface (e.g., an X2-U interface). Signaling between the MeNB 610 and the SeNB 620 may be transmitted via an Xn-C interface (e.g., an X2-C interface).

In some embodiments, the dual connectivity mode may include a split bearer mode and a non-split bearer mode based on a different user plane architecture (as will be described in detail in FIGS. 7-10).

Figure 7:
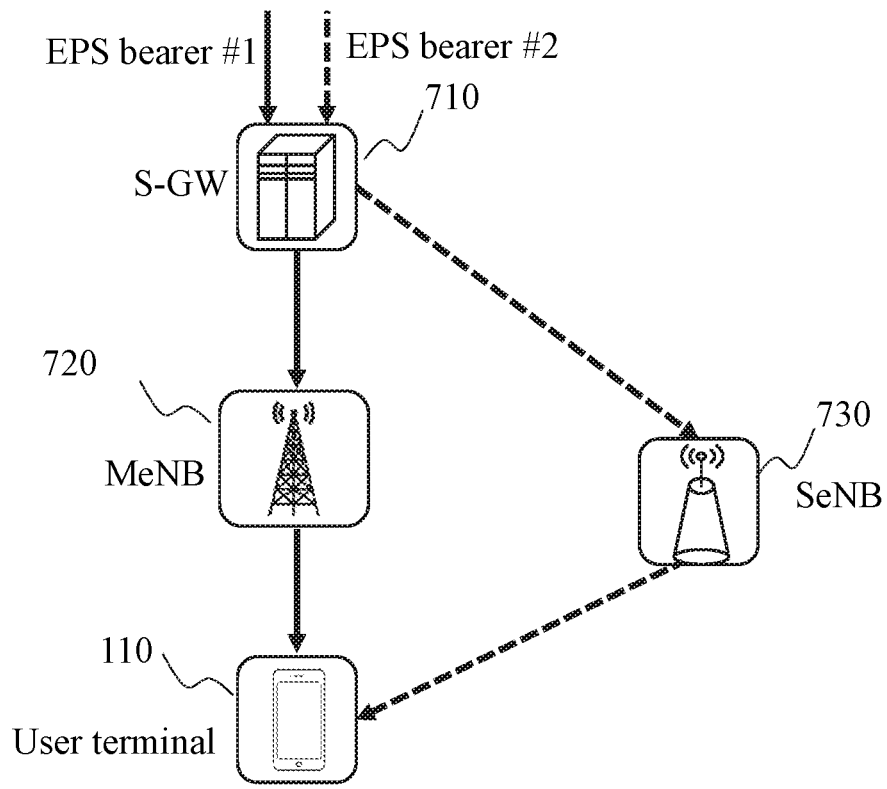
FIG. 7 is a schematic diagram illustrating a first user plane architecture in a dual connectivity mode according to some embodiments of the present disclosure.
Figure 8:
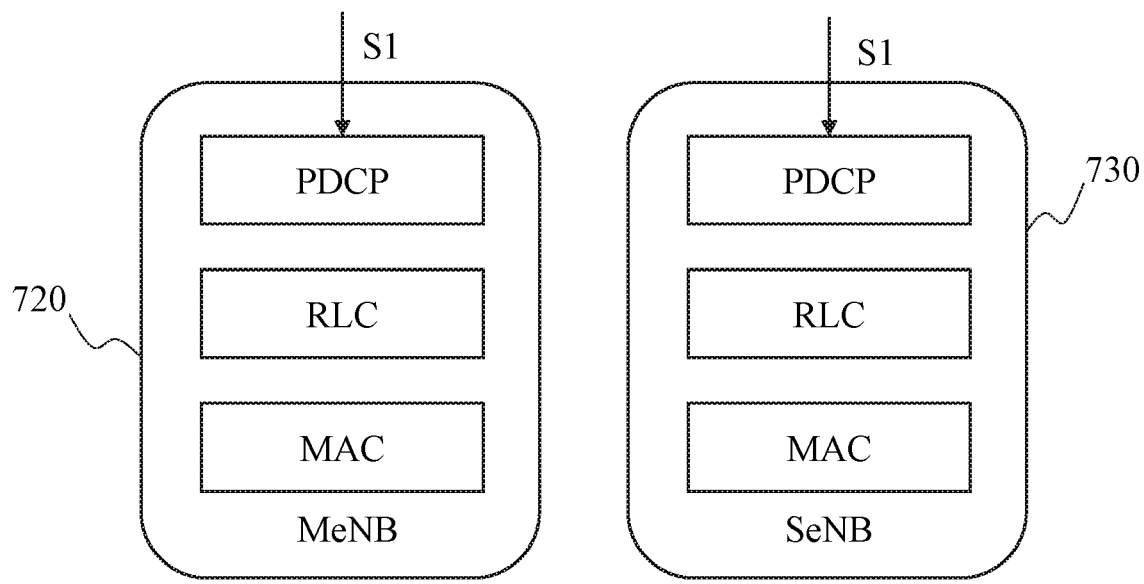
FIG. 8 is a schematic diagram illustrating a first user plane architecture in a dual connectivity mode according to some embodiments of the present disclosure.

FIG. 7 is a schematic diagram illustrating a first user plane architecture (also referred to as a "1A" architecture) in a dual connectivity mode according to some embodiments of the present disclosure. FIG. 7 illustrates a data stream configuration. As illustrated in FIG. 7, in the first user plane architecture, an S1-U interface is used between an S-GW 710 and an MeNB 720. An S1-U interface is used between the S-GW 710 and an SeNB 730. An EPS bearer #1 (indicated by a solid line in FIG. 7) between the user terminal 110 and a P-GW (not shown in FIG. 7) may transmit through the S1-U interface between the S-GW 710 and the MeNB 720. An EPS bearer 2# (indicated by the dash line in FIG. 7) between the user terminal 110 and the P-GW may transmit through the S1-U interface between the S-GW 710 and the SeNB 730. Therefore, in the first user plane architecture, the data stream between the S-GW 710 and the SeNB 730 does not transmit through the MeNB 720. The EPS bearer #1 may be referred to as a master cell group (MCG, i.e., a serving cell group controlled by the MeNB) bear. The EPS bearer #2 may be referred to as a secondary cell group (SCG, i.e., a serving cell group controlled by the SeNB) bearer. FIG. 8 is a schematic diagram illustrating a first user plane architecture in a dual connectivity mode according to some embodiments of the present disclosure. FIG. 8 illustrates a protocol stack configuration corresponding to FIG. 7. As illustrated in FIG. 8, each of the MeNB 720 and the SeNB 730 may process each layer of PDCP, RLC, and MAC. The dual connectivity mode corresponding to the first user plane architecture may be referred to as an SCG bearer mode or a non-split bearer mode. The MeNB 720 and the SeNB 730 may be examples (or embodiments) of the eNB 121 (as illustrated in FIG. 1).

In some embodiments, a ratio of the data stream of the EPS bearer #1 to the data stream of the EPS bearer #2 may be determined based on status information (e.g., load status, energy status, buffer memory status, etc.) of the MeNB 720 and the SeNB 730 using a neural network algorithm. For example, the status information of the MeNB 720 and the SeNB 730 may be input into a trained neural network model. An output of the neural network model may be the ratio between the data stream of the EPS bearer #1 and the data stream of the EPS bearer #2.

Figure 9:
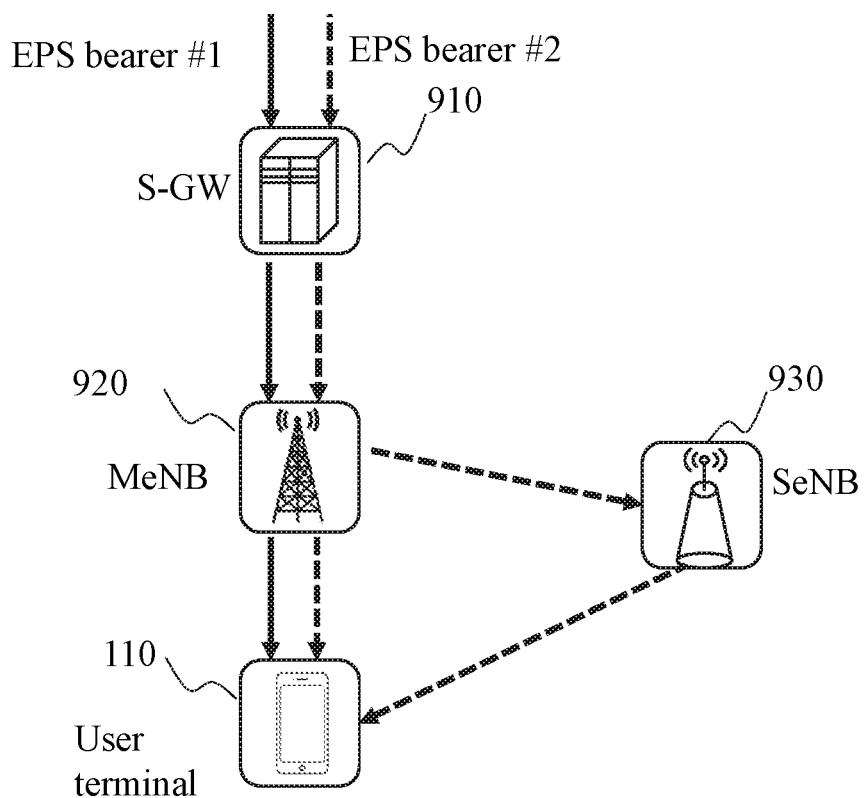
FIG. 9 is a schematic diagram illustrating a second user plane architecture in a dual connectivity mode according to some embodiments of the present disclosure.
Figure 10:
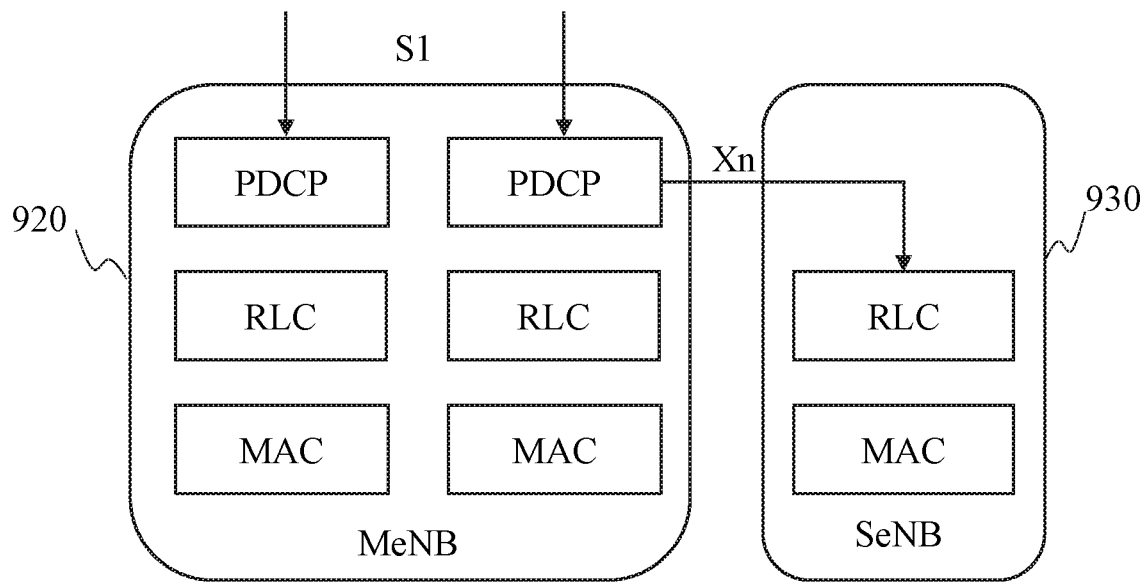
FIG. 10 is a schematic diagram illustrating a second user plane architecture in a dual connectivity mode according to some embodiments of the present disclosure.

FIG. 9 is a schematic diagram illustrating a second user plane architecture (also referred to as a "3C" architecture) in a dual connectivity mode according to some embodiments of the present disclosure. FIG. 9 illustrates a data stream configuration. As illustrated in FIG. 9, in the second user plane architecture, an S1-U interface between an S-GW 910 and an MeNB 920 is used. An EPS bearer #1 (indicated by a solid line in FIG. 9) between the user terminal 110 and a P-GW (not shown in FIG. 9) may transmit through the S1-U interface between the S-GW 910 and the MeNB 920. An EPS bearer #2 (indicated by the dash line in FIG. 9) between the user terminal 110 and the P-GW is split at the MeNB 920. One split bearer of the EPS bearer #2 terminates at the user terminal 110 via the MeNB 920. Another split bearer of the EPS bearer #2 terminates at the user terminal 110 via the SeNB 930. Therefore, in the second user plane architecture, the data stream between the SeNB 930 and the P-GW transmits through the MeNB 920. The EPS bearer #1 may be called as an "MCG bearer", and the EPS bearer 2# may be called as a "split bearer". FIG. 10 is a schematic diagram illustrating a second user plane architecture in a dual connectivity mode according to some embodiments of the present disclosure. FIG. 10 illustrates a protocol stack configuration corresponding to FIG. 9. As illustrated in FIG. 10, for one split bearer of the EPS bearer #2, the processing of each layer is performed by the PDCP layer of the MeNB 920, and the RLC layer and the MAC layer of the SeNB 930. The dual connectivity mode corresponding to the second user plane architecture may be referred to as a split bearer mode. The MeNB 920 and the SeNB 930 may be examples (or embodiments) of the eNB 121 (as illustrated in FIG. 1).

Similar to FIG. 7, in some embodiments, a ratio between the two data streams of the EPS bearer #2 split by the MeNB 920 may be determined based on status information (e.g., load status, energy status, buffer memory status, etc.) of the MeNB 920 and the SeNB 930 using a neural network algorithm.

Figure 11:
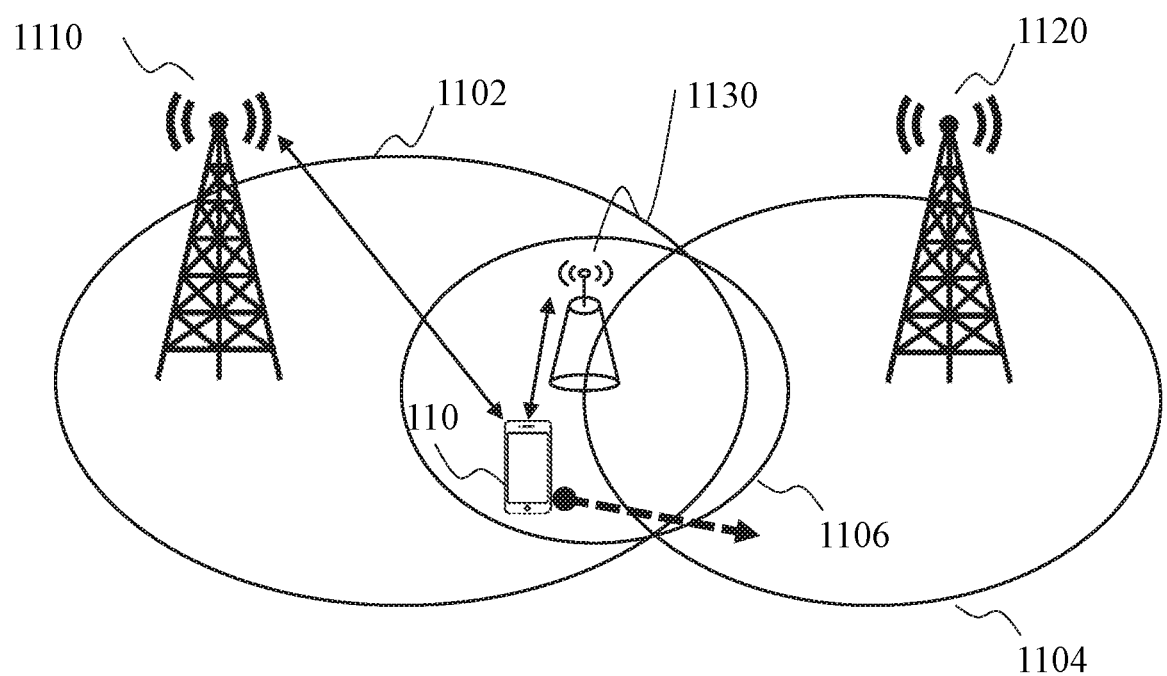
FIG. 11 is a schematic diagram illustrating an exemplary handover according to some embodiments of the present disclosure.

FIG. 11 is a schematic diagram illustrating an exemplary handover according to some embodiments of the present disclosure. As illustrated in FIG. 11, an MeNB 1110 may correspond to a macro cell 1102, and an SeNB 1130 may correspond to a secondary cell 1106. The MeNB 1110 and the SeNB 1130 may be examples (or embodiments) of the eNB 121 (as illustrated in FIG. 1). The user terminal 110 may be located in an overlapping area of the coverage area of the macro cell 1102 and the coverage area of the secondary cell 1106. The user terminal 110 may be connected to the MeNB 1110 and the SeNB 1130, respectively, i.e., the user terminal 110 is in a dual connectivity mode with the MeNB 1110 and the SeNB 1130. The MeNB 1120 may correspond to a macro cell 1104. The MeNB 1120 may be an example of the eNB 121 (as illustrated in FIG. 1). The secondary cell 1106 may be located near a boundary of the macro cell 1102 and the macro cell 1104. As illustrated in FIG. 11, the user terminal 110 moves toward the macro cell 1104 (or the MeNB 1120). In some embodiments, the handover of the MeNB of the user terminal 110 from the MeNB 1120 to the MeNB 1110 may be needed. The MeNB 1110 may also be referred to as a source MeNB or a first MeNB, and the MeNB 1120 may also be referred to as a target MeNB or a second MeNB. Detailed descriptions of the handover process may be found elsewhere in the present disclosure (e.g., FIG. 15 and the descriptions thereof).

Figure 12:
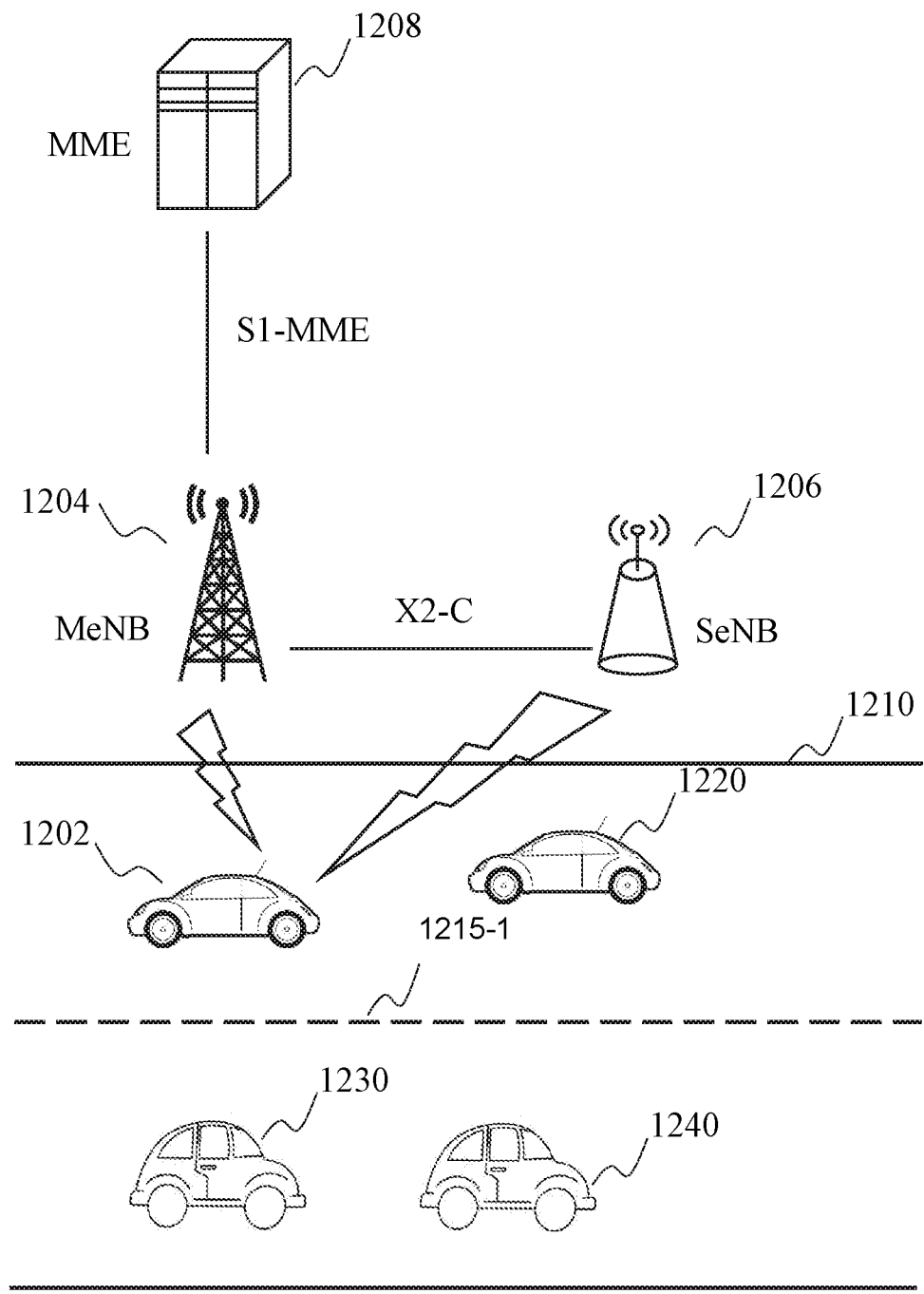
FIG. 12 is a schematic diagram illustrating an exemplary control plane architecture in a dual connectivity mode according to some embodiments of the present disclosure.

FIG. 12 is a schematic diagram illustrating an exemplary control plane architecture in a dual connectivity mode according to some embodiments of the present disclosure. As illustrated in FIG. 12, a vehicle 1202, a vehicle 1220, a vehicle 1230, and a vehicle 1240 may be driving on a road 1210. The road 1210 may include a lane line (i.e., the dash line) 1215-1. An MeNB 1204 and an SeNB 1206 may be eNBs installed at fixed locations besides the road 1210. The MeNB 1204 and the SeNB 1206 may be examples (or embodiments) of the eNB 121 (as illustrated in FIG. 1). The vehicle 1202 may be connected to the MeNB 1204 and the SeNB 1206, respectively, i.e., the vehicle 1202 may be in a dual connectivity mode with the MeNB 1204 and the SeNB 1206. The vehicle 1202 may establish a control plane connection with the MeNB 1204. Signaling (e.g., RRC messages) between the MeNB 1204 and the vehicle 1202 may be transmitted via a Uu interface. The MeNB 1204 may establish a control plane connection with an MME 1208. Signaling between the MME 1208 and the MeNB 1204 may be transmitted via an S1-MME interface. The MeNB 1204 may establish a control plane connection with the SeNB 1206. Signaling between the MeNB 1204 and the SeNB 1206 may be transmitted via an X2-C interface.

As used herein, the term "vehicle" may refer to the vehicle itself, a vehicle terminal, etc. The vehicle terminal may include, for example, an OBU, a laptop computer, an onboard television, a mobile device inside the vehicle, etc. In the present disclosure, "vehicle" and "vehicle terminal" may be used interchangeably. The vehicle 1202 (also referred to as a vehicle terminal) may be an example of the user terminal 110 (as illustrated in FIG. 1).

The dual connectivity mode illustrated in FIG. 12 may be a split bearer mode or a non-split bearer mode. The corresponding user plane architecture may be a "3C" architecture or a "1A" architecture. Descriptions of the user plane architecture may be found elsewhere in the present disclosure (e.g., FIGS. 7-10 and the descriptions thereof).

Figure 13:
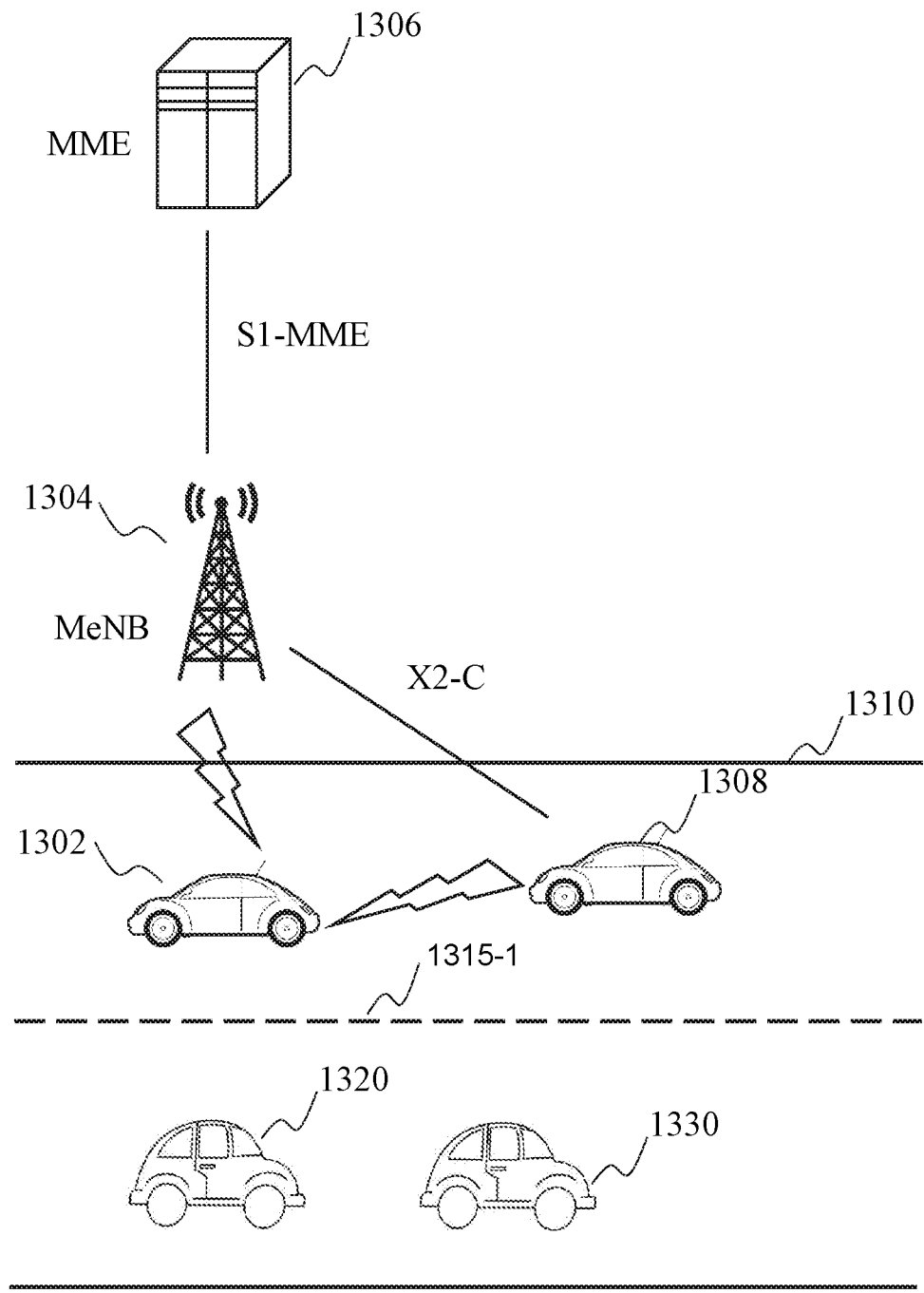
FIG. 13 is a schematic diagram illustrating an exemplary control plane architecture in a dual connectivity mode according to some embodiments of the present disclosure.

FIG. 13 is a schematic diagram illustrating an exemplary control plane architecture in a dual connectivity mode according to some embodiments of the present disclosure. As illustrated in FIG. 13, a vehicle 1302, a vehicle 1308, a vehicle 1320, and a vehicle 1330 may be driving on a road 1310. The road 1310 may include a lane line (i.e., the dash line) 1315-1. An MeNB 1304 may be an eNB installed at a fixed location besides the road 1310. The MeNB 1304 may be an example (or embodiment) of the eNB 121 (as illustrated in FIG. 1). The vehicle 1302 may be connected to the MeNB 1304 and the vehicle 1308, respectively, i.e., the vehicle 1302 may be in a dual connectivity mode with the MeNB 1304 and the vehicle 1308. The vehicle 1308 may serve as an SeNB. The vehicle 1302 may be referred to as a vehicle terminal, and the vehicle 1308 may be referred to as a secondary vehicle terminal. The vehicle 1302 (also referred to as a vehicle terminal) may be an example of the user terminal 110. The vehicle 1302 may establish a control plane connection with the MeNB 1304. Signaling between the MeNB 1304 and the vehicle 1302 may be transmitted via a Uu interface. The MeNB 1304 may establish a control plane connection with an MME 1306. Signaling between the MME 1306 and the MeNB 1304 may be transmitted via an S1-MME interface. The MeNB 1304 may establish a control plane connection with the vehicle 1308. Signaling between the MeNB 1304 and the vehicle 1308 may be transmitted via an X2-C interface. The dual connectivity mode illustrated in FIG. 13 may be a split bearer mode or a non-split bearer mode, and the corresponding user plane architecture may be a "3C" architecture or a "1A" architecture. Descriptions of the user plane architecture may be found elsewhere in the present disclosure (e.g., FIGS. 7-10 and the descriptions thereof).

As illustrated in FIG. 13, when there is no SeNB installed at any fixed location near the vehicle 1302, the vehicle 1308 near the vehicle 1302 may serve as an SeNB. Therefore, the dual connectivity mode of the vehicle 1302 is achieved, thus ensuring the communication quality of the vehicle 1302 (e.g., ensuring the reliability of data transmission).

The vehicle 1308, serving as an SeNB, may communicate with other communication devices (e.g., the vehicle 1302, the MeNB 1304, the MME 1306, etc.). For example, the vehicle 1308 may include a wireless communication device installed on the vehicle 1308, such as an OBU (or an onboard television, a laptop computer), etc. The vehicle 1308 may communicate with other communication devices via the OBU. As another example, the vehicle 1308 may include a mobile device (e.g., a mobile phone) inside the vehicle 1308. The vehicle 1308 may communicate with other communication devices via the mobile device.

The vehicle 1308, serving as an SeNB, may be a secondary vehicle terminal that meets a preset condition. In some embodiments, the preset condition may include that the distance between the vehicle 1308 (i.e., the secondary vehicle terminal) and the vehicle 1302 (i.e., the vehicle terminal) is not greater than a first preset threshold within a time interval. That is, the vehicle 1308 is located near the vehicle 1302. The first preset threshold may be a default setting of the LTE system 100, or may be adjustable under different situations. Merely by way of example, the first preset threshold may be 100m, 200m, etc. In some embodiments, the preset condition may include that the relative speed between the vehicle 1308 (i.e., the secondary vehicle terminal) and the vehicle 1302 (i.e., the vehicle terminal) is within a speed range within a time interval. That is, a driving speed of the vehicle 1308 is close to a driving speed of the vehicle 1302. The speed range may be a default setting of the LTE system 100, or may be adjustable under different situations. Merely by way of example, the speed range may be between −5 Km/h and 5 Km/h. In some embodiments, the preset condition may include that the overlapping degree between a driving route of the vehicle 1308 (i.e., the secondary vehicle terminal) and a driving route of the vehicle 1308 (i.e., the secondary vehicle terminal) is not less than a second preset threshold within a time interval. That is, the driving route of the vehicle 1308 may be similar to the driving route of the vehicle 1302. The second preset threshold may be a default setting of the LTE system 100, or may be adjustable under different situations. Merely by way of example, the second preset threshold may be 70%, 80%, 90%, etc.

In some embodiments, the time interval may be a period of time corresponding to the vehicle 1302 driving on the road 1310 for a certain distance. In some embodiments, during the driving of the vehicle 1302, the MeNB of the vehicle 1302 may be switched from the MeNB 1304 to another MeNB. The time interval may include a period of time corresponding to the MeNB handover process of the vehicle 1302. During the MeNB handover process, the connection between the vehicle 1302 (i.e., the vehicle terminal) and the vehicle 1308 (i.e., the secondary vehicle terminal) may be maintained.

In some embodiments, the distance between the vehicle 1302 and the vehicle 1308, the relative speed between the vehicle 1302 and the vehicle 1308, and/or the driving routes of the vehicle 1302 and the vehicle 1308 may be determined by positioning devices (e.g., a GPS device) of the vehicle 1302 and the vehicle 1308.

In some embodiments, the vehicle 1302 (i.e., the vehicle terminal) may determine the vehicle 1308 as the SeNB that meets the preset condition based on historical data of the vehicle 1302 and historical data of the vehicle 1308 (i.e., the secondary vehicle terminal). The historical data may include locations, speeds, etc., within a preset time period. For example, the vehicle 1302 may obtain the historical data of the vehicle 1308, the vehicle 1320, and the vehicle 1330 within a preset time period. The vehicle 1302 may predict locations, speeds, etc., of the vehicle 1308, the vehicle 1320, and the vehicle 1330 within a time period in the future (e.g., the time interval) based on the obtained historical data using a neural network algorithm. Further, the vehicle 1302 may select the vehicle 1308 from the vehicle 1308, the vehicle 1320, and the vehicle 1330 as the SeNB that meets the preset condition.

Figure 14:
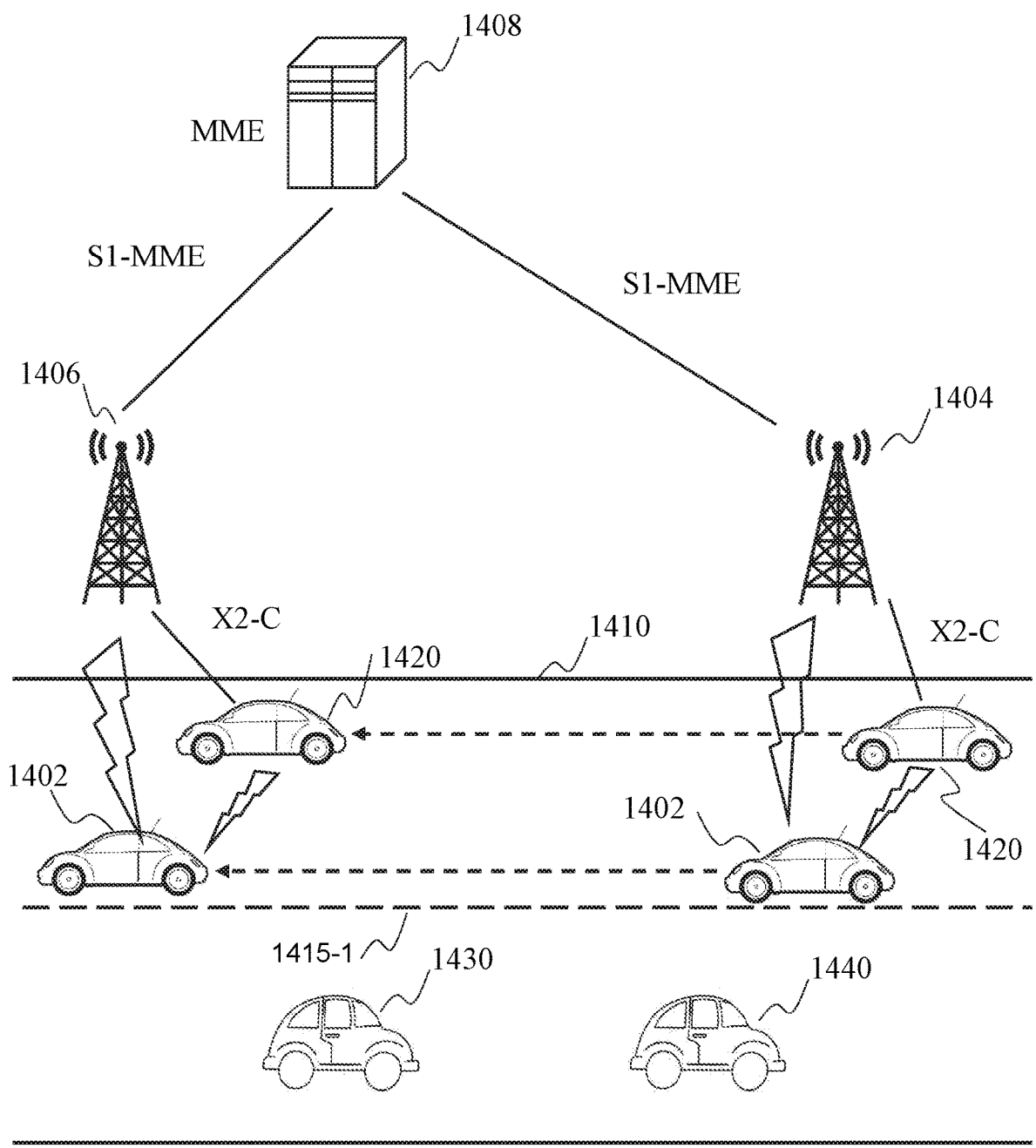
FIG. 14 is a schematic diagram illustrating an exemplary handover according to some embodiments of the present disclosure.

FIG. 14 is a schematic diagram illustrating an exemplary handover according to some embodiments of the present disclosure. As illustrated in FIG. 14, a vehicle 1402, a vehicle 1420, a vehicle 1430, and a vehicle 1440 may be driving on a road 1410. The road 1410 may include a lane line (i.e., the dash line) 1415-1. An MeNB 1404 and an MeNB 1406 may be eNBs installed at fixed locations besides the road 1410. The MeNB 1404 and the MeNB 1406 may be examples (or embodiments) of the eNB 121 (as illustrated in FIG. 1).

When the vehicle 1402 is located in the macro cell coverage area corresponding to the MeNB 1404, the vehicle 1402 may be connected to the MeNB 1404 and the vehicle 1420, respectively, i.e., the vehicle 1402 may be in a dual connectivity mode with the MeNB 1404 and the vehicle 1420. The vehicle 1420 may serve as an SeNB. The vehicle 1402 may also be referred to as a vehicle terminal, and the vehicle 1420 may also be referred to as a secondary vehicle terminal. The vehicle 1402 (also referred to as a vehicle terminal) may be an example of the user terminal 110 (as illustrated in FIG. 1). The vehicle 1402 may establish a control plane connection with the MeNB 1404. Signaling between the MeNB 1404 and the vehicle 1402 may be transmitted via a Uu interface. The MeNB 1404 may establish a control plane connection with an MME 1408. Signaling between the MME 1408 and the MeNB 1404 may be transmitted via an S1-MME interface. The MeNB 1404 may establish a control plane connection with the vehicle 1420. Signaling between the MeNB 1404 and the vehicle 1420 may be transmitted via an X2-C interface.

When the vehicle 1402 (i.e., the vehicle terminal) moves from the macro cell coverage area corresponding to the MeNB 1404 to the macro cell coverage area corresponding to the MeNB 1406, the MeNB of the vehicle 1402 may be switched from the MeNB 1404 to the MeNB 1406. During the handover process, the connection between the vehicle 1402 and the vehicle 1420 (i.e., the secondary vehicle terminal) may be maintained. Detailed descriptions of the handover process may be found elsewhere in the present disclosure (e.g., FIG. 15 and the descriptions thereof).

When the vehicle 1402 is located in the macro cell coverage area corresponding to the MeNB 1406, the vehicle 1402 may be connected to the MeNB 1406 and the vehicle 1420, respectively, i.e., the vehicle 1402 may be in a dual connectivity mode (the split bearer mode or the non-split bearer mode) with the MeNB 1406 and the vehicle 1420. The vehicle 1402 may establish a control plane connection with the MeNB 1406. Signaling between the MeNB 1406 and the vehicle 1402 may be transmitted via a Uu interface. The MeNB 1406 may establish a control plane connection with the MME 1408. Signaling between the MME 1408 and the MeNB 1406 may be transmitted via an S1-MME interface. The MeNB 1406 may establish a control plane connection with the vehicle 1420. Signaling between the MeNB 1406 and the vehicle 1420 may be transmitted via an X2-C interface.

The dual connectivity mode illustrated in FIG. 14 may be a split bearer mode or a non-split bearer mode, and the corresponding user plane architecture may be a "3C" architecture or a "1A" architecture. Descriptions of the user plane architecture may be found elsewhere in the present disclosure (e.g., FIGS. 7-10 and the descriptions thereof).

The MeNB 1404 may also be referred to as a source MeNB or a first MeNB, and the MeNB 1406 may also be referred to as a target MeNB or a second MeNB.

As illustrated in FIG. 14, when there is no SeNB installed at any fixed location near the vehicle 1402, the vehicle 1420 near the vehicle 1402 may serve as an SeNB. Therefore, the dual connectivity mode of the vehicle 1402 is achieved, thus ensuring the communication quality of the vehicle 1402 (e.g., ensuring the reliability of data transmission).

The vehicle 1420, serving as an SeNB, may communicate with other communication devices (e.g., the vehicle 1402, the MeNB 1404, the MME 1408, the MeNB 1406, etc.). For example, the vehicle 1420 may include a wireless communication device installed on the vehicle 1420, such as an OBU (or an onboard television, a laptop computer), etc. The vehicle 1420 may communicate with other communication devices via the OBU. As another example, the vehicle 1420 may include a mobile device (e.g., a mobile phone) inside the vehicle 1308. The vehicle 1420 may communicate with other communication devices via the mobile device.

The vehicle 1420, serving as an SeNB, may be a secondary vehicle terminal that meets a preset condition. In some embodiments, the preset condition may include that the distance between the vehicle 1420 (i.e., the secondary vehicle terminal) and the vehicle 1402 (i.e., the vehicle terminal) is not greater than a first preset threshold within a time interval. That is, the vehicle 1420 is located near the vehicle 1402. The first preset threshold may be a default setting of the LTE system 100, or may be adjustable under different situations. Merely by way of example, the first preset threshold may be 100 m, 200 m, etc. In some embodiments, the preset condition may include that the relative speed between the vehicle 1420 (i.e., the secondary vehicle terminal) and the vehicle 1402 (i.e., the vehicle terminal) is within a speed range within a time interval. That is, a driving speed of the vehicle 1420 is close to a driving speed of the vehicle 1402. The speed range may be a default setting of the LTE system 100, or may be adjustable under different situations. Merely by way of example, the speed range may be between −5 Km/h and 5 Km/h. In some embodiments, the preset condition may include that the overlapping degree between a driving route of the vehicle 1420 (i.e., the secondary vehicle terminal) and a driving route of the vehicle 1402 (i.e., the vehicle terminal) is not less than a second preset threshold within a time interval. That is, the driving route of the vehicle 1420 may be similar to the driving route of the vehicle 1402. The second preset threshold may be a default setting of the LTE system 100, or may be adjustable under different situations. Merely by way of example, the second preset threshold may be 70%, 80%, 90%, etc.

In some embodiments, during the driving of the vehicle 1402, the MeNB of the vehicle 1402 may be switched from the MeNB 1404 to the MeNB 1404. In order to ensure a seamless handover, during the MeNB handover process, the connection between the vehicle 1402 (i.e., the vehicle terminal) and the vehicle 1420 (i.e., the secondary vehicle terminal) may be maintained. Therefore, the time interval may include a period of time corresponding to the MeNB handover of the vehicle 1402 from the MeNB 1404 to the MeNB 1406. Detailed descriptions of the preset condition may be found elsewhere in the present disclosure (e.g., FIG. 13 and the descriptions thereof).

Figure 15:
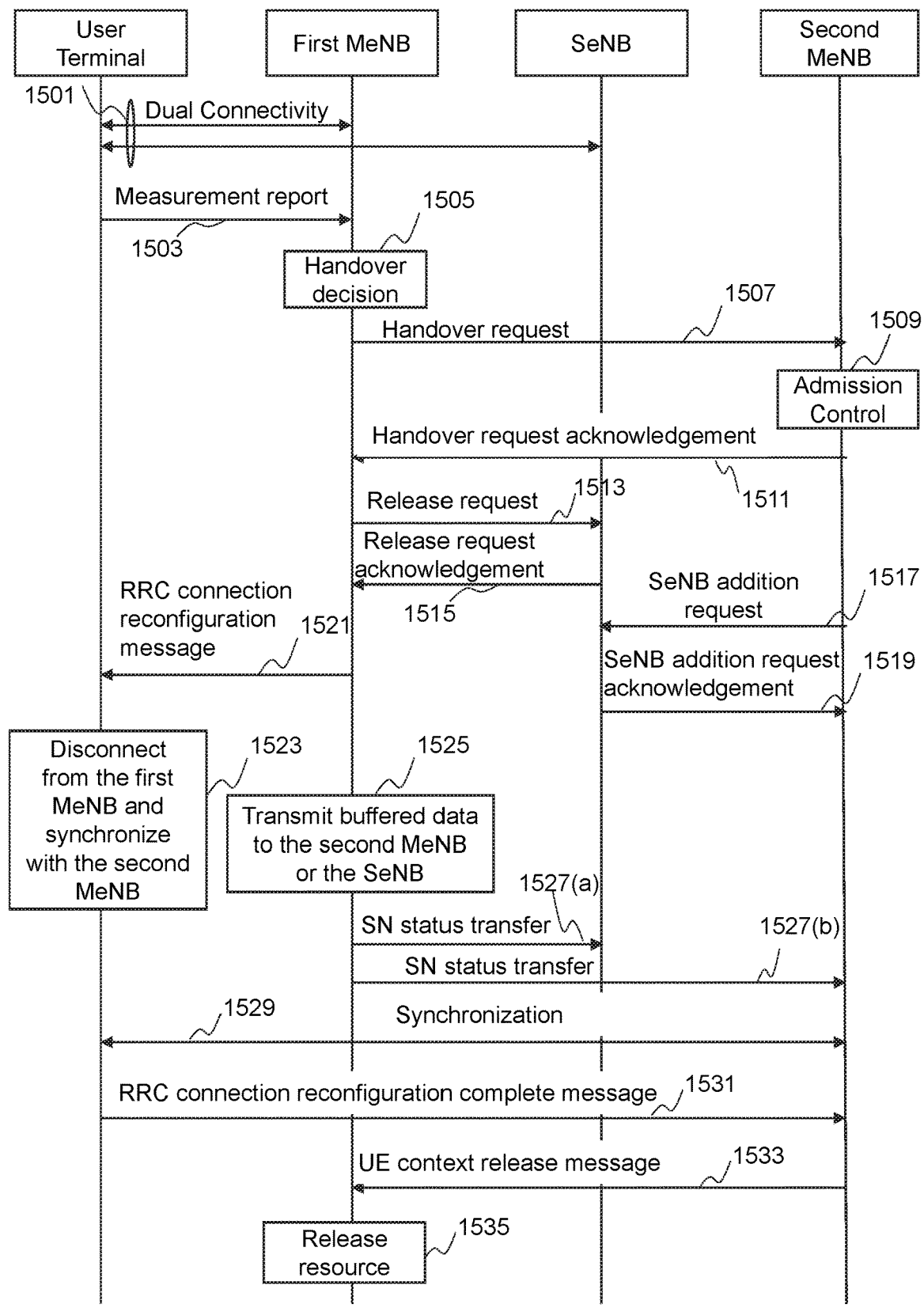
FIG. 15 is a schematic diagram illustrating an exemplary process for a macro eNB (MeNB) handover according to some embodiments of the present disclosure.

FIG. 15 is a schematic diagram illustrating an exemplary process 1500 for an MeNB handover according to some embodiments of the present disclosure. The process 1500 may be executed by the LTE system 100. As illustrated in FIG. 15, by performing the process 1500, an MeNB of a user terminal (e.g., the user terminal 110) may be switched from a first MeNB (also referred to as a source MeNB) to a second MeNB (also referred to as a target MeNB). In some embodiments, the MeNB handover of the user terminal 110 in FIG. 11 (handover from the MeNB 1110 to the MeNB 1120) may be implemented by performing one or more operations of the process 1500. In some embodiments, the MeNB handover of the vehicle terminal (i.e., the vehicle 1402) in FIG. 14 (handover from the MeNB 1404 to the MeNB 1406) may be implemented by performing one or more operations of the process 1500.

In 1501, a connection between the user terminal and the first MeNB may be established, and a connection between the user terminal and the SeNB may be established. The user terminal may be in a dual connectivity mode (the split bearer mode or the non-split bearer mode) with the first MeNB and the SeNB. The SeNB may be an SeNB installed at a fixed location or a secondary vehicle terminal meeting a preset condition. For example, as illustrated in FIG. 14, the vehicle terminal (i.e., the vehicle 1402) may be in a dual connectivity mode with the MeNB 1404 and the secondary vehicle terminal (i.e., the vehicle 1420).

The dual connectivity mode may be based on a dual connectivity establishment process. During the dual connectivity establishment process, the user terminal may firstly establish a connection with the first MeNB, and then establish a connection with the SeNB. Detailed descriptions of the dual connectivity establishment process will be described in FIGS. 16-18.

In 1503, the user terminal may transmit a measurement report to the first MeNB. The measurement report may include the strength of signals received by the user terminal from the first MeNB, the strength of signals received by the user terminal from the second MeNB, the strength of signals received by the user terminal from other eNBs, etc. In some embodiments, the measurement report may include a reference signal received power (RSRP), reference signal received quality (RSRQ), etc. In some embodiments, the first MeNB may transmit measurement configuration information (e.g., a measurement object) to the user terminal. The user terminal may perform a measurement according to the measurement configuration information, and transmit the measurement report to the first MeNB. In some embodiments, the user terminal may periodically transmit the measurement report to the first MeNB according to a time interval and the total number of times of reporting set by the first MeNB. In some embodiments, when a measurement report condition is satisfied (e.g., the strength of signals received by the user terminal from the first MeNB is less than a set threshold), the user terminal may transmit the measurement report to the first MeNB.

In 1505, the first MeNB may process the measurement report. In some embodiments, the first MeNB may determine that the user terminal is moving from a first cell coverage area corresponding to the first MeNB to a second cell coverage area corresponding to the second MeNB based on the measurement report. Therefore, the first MeNB may generate a handover decision. In some embodiments, the measurement report may indicate that the strength of signals received by the user terminal from the first MeNB is less than a set threshold, the strength of signals received by the user terminal from the second MeNB is greater than the set threshold, and the strength of signals received by the user terminal from other eNBs is less than the set threshold. The first MeNB may determine that the user terminal is leaving from the first cell coverage area corresponding to the first MeNB and entering the second cell coverage area corresponding to the second MeNB. Therefore, the first MeNB may generate a handover decision. For example, as illustrated in FIG. 14, the MeNB 1404 may determine that the vehicle terminal (i.e., the vehicle 1402) is moving from the cell coverage area corresponding to the MeNB 1404 to the cell coverage area corresponding to the MeNB 1406 based on the measurement report transmitted from the vehicle terminal. The MeNB 1404 may generate a handover decision.

In 1507, the first MeNB may transmit a handover request to the second MeNB based on the handover decision. In some embodiments, in order to achieve a seamless handover, the handover request may instruct the handover of MeNB of the user terminal from the first MeNB to the second MeNB, and may instruct to maintain the connection between the user terminal and the SeNB. The handover request may include current status information (e.g., load status, energy status, buffer memory status, etc.) of the first MeNB, basic configuration information of the first MeNB (e.g., an identification (ID), configuration information of a PDCP layer, a core network bearer identifier, a radio bearer identifier, etc., of the first MeNB), etc.

In 1509, the second MeNB may perform admission control based on the handover request. For example, the second MeNB may identify the authenticity of the first MeNB (e.g., determine whether the first MeNB is a legal base station) based on the basic configuration information of the first MeNB. The second MeNB may then determine whether to agree to the handover request. In some embodiments, the second MeNB may further determine whether to agree to the handover request based on a current load of the second MeNB. The current load may include the number of user terminals accessing to the second MeNB. For example, when the number is not less than a load threshold, the second MeNB may not agree to the handover request. When the number is less than the load threshold, the second MeNB may agree to the handover request.

When the second MeNB agrees to the handover request, in 1511, the second MeNB may transmit a handover request acknowledgement to the first MeNB. The handover request acknowledgement may include current status information (e.g., load status, energy status, the current remaining buffer memory, etc.) of the second MeNB, basic configuration information of the second MeNB (e.g., an ID, configuration information of a PDCP layer, a core network bearer identifier, a radio bearer identifier, etc., of the second MeNB), etc.

In 1513, the first MeNB may transmit a release request to the SeNB. The release request may instruct the SeNB to release the connection to the first MeNB, and stop transmitting signaling and/or data to the first MeNB. In some embodiments, when transmitting the release request, the SeNB may still have signaling and/or data that needs to be exchanged with the first MeNB. The release request may include descriptive information. The descriptive information may cause the first MeNB to process the signaling and/or data exchanged with the SeNB before releasing the connection with the SeNB.

In 1515, the SeNB may transmit a release request acknowledgement to the first MeNB in response to the release request.

In 1517, the second MeNB may transmit an SeNB addition request to the SeNB. The SeNB addition request may indicate that the second MeNB requests the SeNB to allocate radio resources.

When the SeNB agrees to the SeNB addition request, in 1519, the SeNB may transmit an SeNB addition request acknowledgement to the second MeNB. The SeNB may provide corresponding radio resources to the second MeNB. For example, the SeNB may establish a connection with the second MeNB.

In 1521, the user terminal may receive a handover command from the first MeNB. The handover command may instruct the user terminal to perform a handover operation.

In 1523, the user terminal may be disconnected from the first MeNB and synchronization between the user terminal and the second MeNB may be established based on the handover command. The connection between the user terminal and the SeNB may be maintained. For example, as illustrated in FIG. 14, the vehicle terminal (i.e., the vehicle 1402) may receive a handover command from the MeNB 1404. The vehicle terminal may be disconnected from the MeNB 1404 and synchronization between the vehicle and the MeNB 1406 may be established based on the handover command. The connection between the vehicle terminal and the secondary vehicle terminal (i.e., the vehicle 1420) may be maintained. In some embodiments, the user terminal may receive the handover command in an RRC message. The RRC message may include an RRC connection reconfiguration message. For example, as illustrated in FIG. 15, the first MeNB may transmit an RRC connection reconfiguration message to the user terminal. The RRC connection reconfiguration message may include the handover command and a measurement control message (e.g., a measurement object, etc.) of the second MeNB. The user terminal may perform a measurement based on the measurement control message. Upon receiving the RRC connection reconfiguration message, the user terminal may be disconnected from the first MeNB and may synchronize with the second MeNB. The user terminal may maintain the connection with the SeNB. In 1523, the user terminal may perform a connection reconfiguration operation based on the RRC connection reconfiguration message to achieve the dual connectivity mode of the user terminal with the second MeNB and the SeNB.

In 1525, if there is still buffered data related to the user terminal in the current buffer memory of the first MeNB, the first MeNB may transmit the buffered data to the second MeNB or the SeNB. The first MeNB may determine whether the current remaining buffer memory of the second MeNB can accept the buffered data. If the current remaining buffer memory of the second MeNB is insufficient to accept the buffered data, the first MeNB may transmit the buffered data to the SeNB. In some embodiments, the first MeNB may transmit a sequence number (SN) status transfer message to the SeNB to deliver the buffered data to the SeNB (operation 1527(*a*)). If the current remaining buffer memory of the second MeNB is sufficient to accept the buffered data, the first MeNB may transmit the buffered data to the second MeNB. In some embodiments, the first MeNB may transmit an SN status transfer message to the second MeNB to deliver the buffered data to the second MeNB (operation 1527(*b*)).

In 1529, the user terminal may synchronize with the second MeNB (i.e., synchronization between the user terminal and the second MeNB may be established) by performing a random access process.

After the user terminal completes the connection reconfiguration operation, in 1531, the user terminal may transmit an RRC connection reconfiguration complete message to the second MeNB.

In 1533, the second MeNB may transmit a UE context release message to the first MeNB.

In 1535, the first MeNB may release the radio resources provided to the user terminal based on the UE context release message to complete the handover process.

During the MeNB handover process, data and/or signaling among the first MeNB, the SeNB, and/or the second MeNB may be transmitted via X2 interfaces. The first MeNB, the second MeNB, and/or the SeNB illustrated in FIG. 15 may be examples of the eNB 121 (as illustrated in FIG. 1).

By performing the process 1500, the MeNB of the user terminal may be switched from the first MeNB to the second MeNB. During the MeNB handover, the connection between the user terminal and the SeNB is maintained, thus achieving a seamless handover.

It should be noted that the above description of the process 1500 for the MeNB handover is merely provided for the purposes of illustration, and not intended to limit the scope of the present disclosure. For persons having ordinary skills in the art, multiple variations or modifications may be made on the process 1500 under the teachings of the present disclosure. However, those variations and modifications do not depart from the scope of the present disclosure. For example, the order of operation 1529 and operation 1531 may be interchanged. In some embodiments, after the user terminal completes the connection reconfiguration operation, the user terminal may also transmit an RRC connection reconfiguration complete message to the SeNB.

Figure 16:
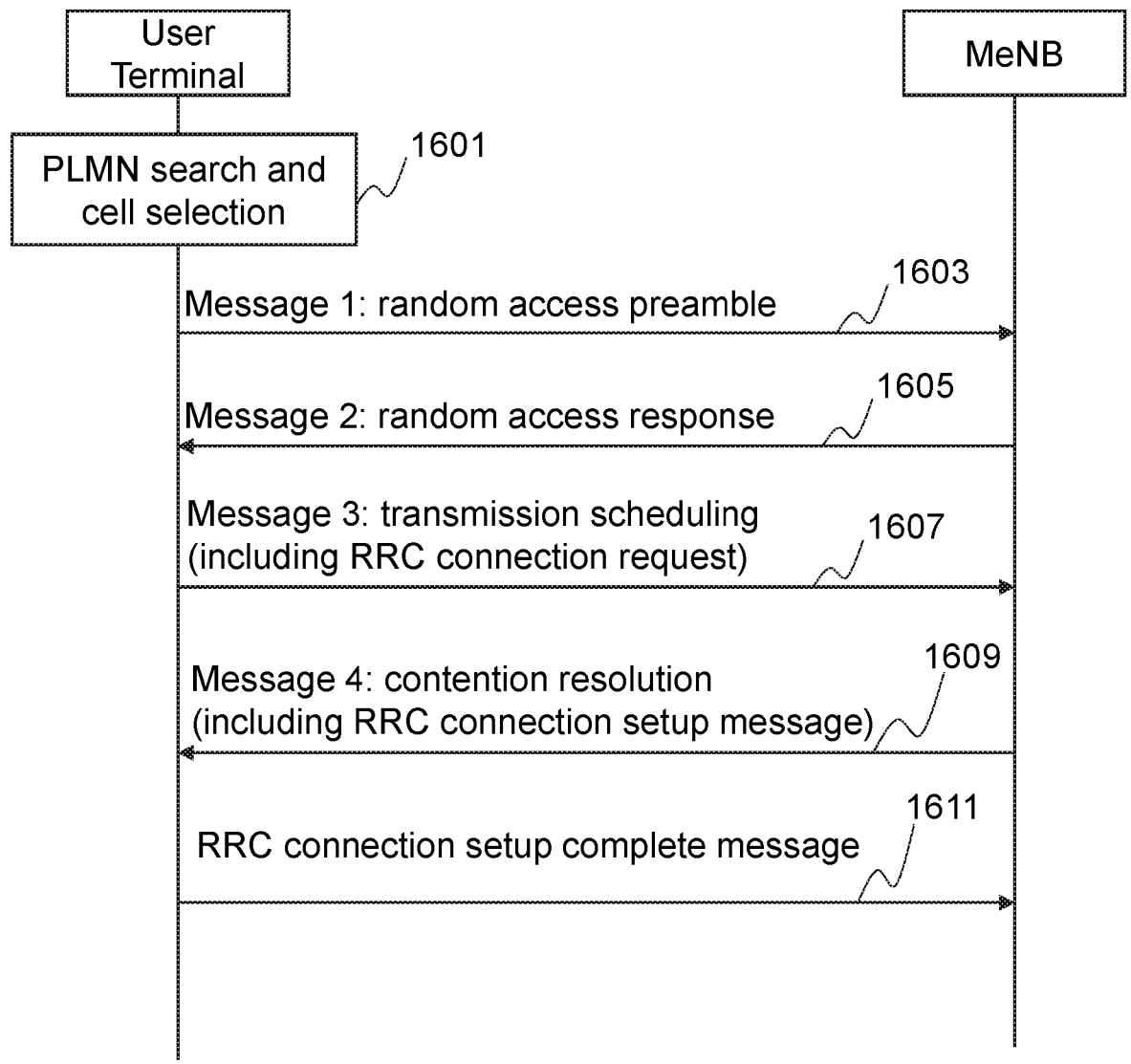
FIG. 16 is a schematic diagram illustrating a process for a contention-based random access according to some embodiments of the present disclosure.

FIG. 16 is a schematic diagram illustrating a process 1600 for a contention-based random access according to some embodiments of the present disclosure. The process 1600 may be executed by the LTE system 100. In some embodiments, establishing a connection between the user terminal and the first MeNB in operation 1501 of the process 1500 in FIG. 15 may be implemented by performing one or more operations of the process 1600. In some embodiments, the synchronization between the user terminal and the second MeNB in operation 1529 of the process 1500 may also be implemented by performing one or more operations of the process 1600.

In 1601, a user terminal (e.g., the user terminal 110) may perform public land mobile network (PLMN) search and a cell selection. In some embodiments, the user terminal may perform the PLMN search and the cell selection by reading a master information block (MIB) and a system information block (SIB) to determine an MeNB that communicates with the user terminal.

In 1603, the user terminal may transmit message 1 (including a random access preamble) to the MeNB. The random access preamble may indicate a random access attempt of the user terminal to the MeNB, and enable the MeNB to estimate output delay between the MeNB and the user terminal.

In response to the message 1, in 1605, the MeNB may transmit message 2 (including a random access response) to the user terminal. The message 2 may include an uplink resource allocation information, timing advance, etc.

In 1607, the user terminal may transmit message 3 (including a transmission scheduling message) to the MeNB. The message 3 may include an RRC connection request.

In 1609, the MeNB may transmit message 4 (including a contention resolution message) to the user terminal. The message 4 may be used for the contention resolution. The user terminal may be determined as a specific user terminal of the random access process. The message 4 may include an RRC connection setup message.

In response to the RRC connection setup message, in 1611, the user terminal may transmit an RRC connection setup complete message to the MeNB. The RRC connection setup complete message may indicate that the user terminal has completed establishing the connection (an RRC connection) with the MeNB.

By performing the process 1600 described above, the user terminal may establish a communication connection with the MeNB. For example, as illustrated in FIG. 14, by performing the process 1600, the vehicle terminal (i.e., the vehicle terminal 1402) may establish the communication connection with the MeNB 1404.

Figure 17:
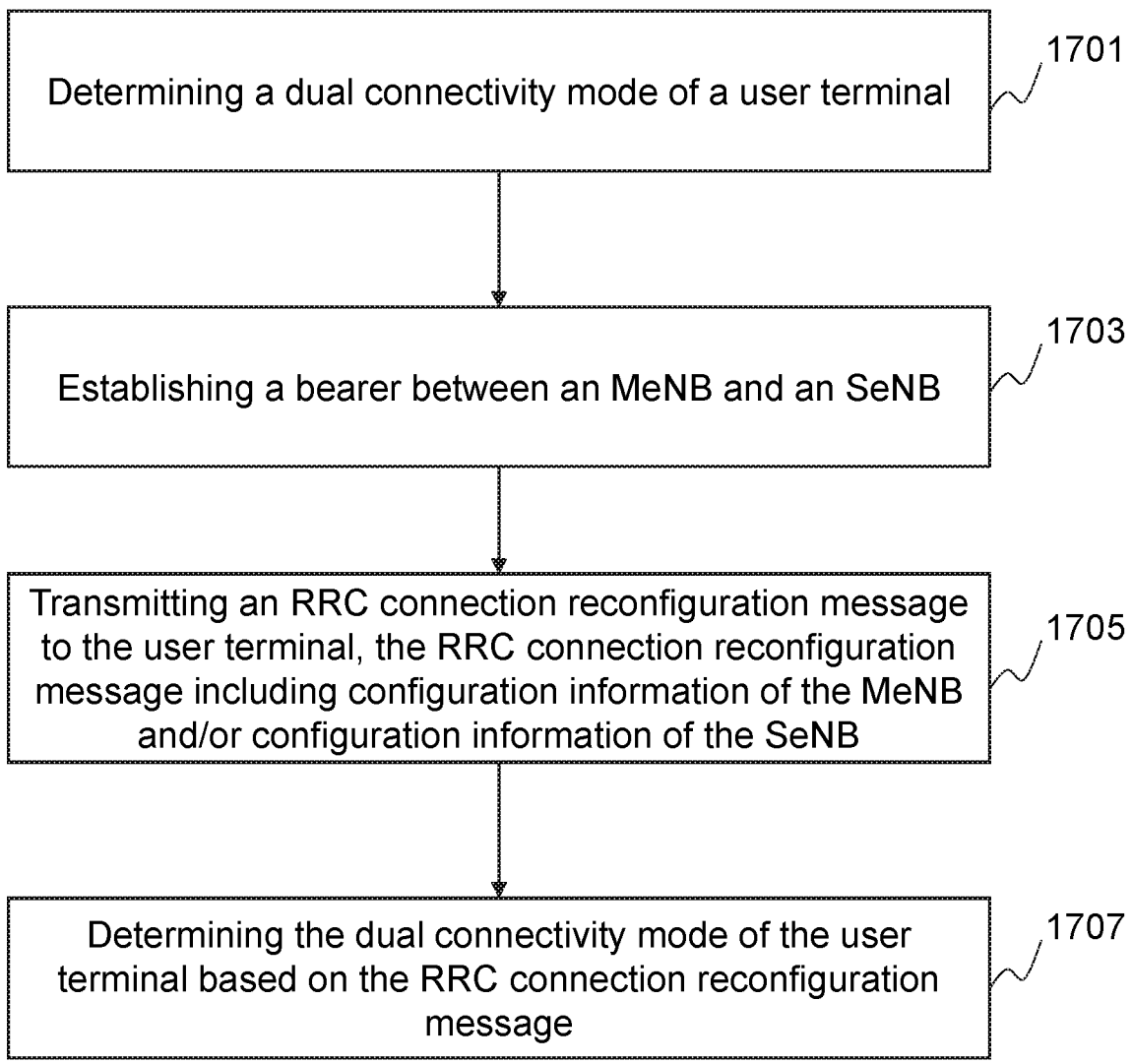
FIG. 17 is a flowchart illustrating an exemplary process for establishing dual connectivity according to some embodiments of the present disclosure.

FIG. 17 is a flowchart illustrating an exemplary process 1700 for establishing dual connectivity according to some embodiments of the present disclosure. The process 1700 may be executed by the LTE system 100. In some embodiments, operation 1501 of the process 1500 in FIG. 15 may be implemented by performing one or more operations of the process 1700.

In some embodiments, before performing operation 1701, a user terminal (e.g., the user terminal 110) has established a connection with the MeNB.

In 1701, the MeNB may determine a dual connectivity mode of the user terminal. The dual connectivity mode may include a split bearer mode or a non-split bearer mode. The MeNB may be triggered by different subjects to initiate the establishment of the dual connectivity, and determine a dual connectivity mode. In some embodiments, the MeNB may be triggered by an MME to initiate the establishment of the dual connectivity. In some embodiments, the MeNB may actively initiate the establishment of the dual connectivity. In some embodiments, the MeNB may be triggered by an SeNB to initiate the establishment of the dual connectivity. The MeNB may determine the dual connectivity mode based on various factors. In some embodiments, the MeNB may determine the dual connectivity mode based on a local configuration of the MeNB. For example, if the local configuration of the MeNB restricts the data forwarding of the MeNB, the MeNB may determine that the dual connectivity mode is the non-split bearer mode; if the local configuration of the MeNB indicates that the MeNB has a capability of data forwarding, the MeNB may determine that the dual connectivity mode is the split bearer mode. In some embodiments, the MeNB may determine the dual connectivity mode based on factors such as load status, service quality, and channel quality of the MeNB and/or the SeNB.

In 1703, a bearer between the MeNB and an SeNB may be established. In some embodiments, during the establishment of the dual connectivity, the MeNB may establish bearers with the SeNB and the MME, respectively. For example, an X2 bearer between the MeNB and the SeNB may be established, and an S1 bearer between the MeNB and the MME may be established. The order in which the MeNB establishing the bearers with the SeNB and the MME is not fixed. For example, the MeNB may firstly establish the bearer with the MME, and then the MeNB may establish the bearer with the SeNB. As another example, the MeNB may firstly establish the bearer with the SeNB, and then the MeNB may establish the bearer with the MME. As still another example, the MeNB may establish the bearer with the SeNB during the process of establishing the bearer between the MeNB and the MME. More descriptions of the establishment of the bearer will be found in FIG. 18 and the descriptions thereof.

In 1705, the MeNB may transmit an RRC connection reconfiguration message to the user terminal. The user terminal may perform a connection reconfiguration operation based on the RRC connection reconfiguration message to the dual connectivity mode of the user terminal with the MeNB and the SeNB.

The RRC connection reconfiguration message may include configuration information of the MeNB and/or configuration information of the SeNB. In some embodiments, the configuration information of the MeNB may include a configuration of a PDCP layer, an EPS-bearer identifier, a data radio bearer (DRB) identifier, a configuration of an RLC layer, a logical channel identifier and a logical channel configuration, or the like, or any combination thereof. In some embodiments, the configuration information of the SeNB may include a cell index, a cell identifier, a configuration of an RLC layer, a logical channel identifier and a logical channel configuration, a configuration of a PDCP layer, an EPS-bearer identifier, a DRB identifier, or the like, or any combination thereof.

In 1707, the user terminal may determine the dual connectivity mode of the user terminal based on the RRC connection reconfiguration message. In some embodiments, if the configuration information of the SeNB in the RRC connection reconfiguration message includes at least one of the configuration of the PDCP layer, the EPS-bearer identifier, and the DRB identifier, the user terminal may determine that the dual connectivity mode is the non-split bearer mode. If the configuration information of the SeNB in the RRC connection reconfiguration message does not include the configuration of the PDCP layer, the EPS-bearer identifier, or the DRB identifier, the user may determine that the dual connectivity mode is the split bearer mode.

By performing the process 1700 described above, the connection between the user terminal and the MeNB and the connection between the user terminal and the SeNB may be established. The user terminal may be in the dual connectivity mode with the MeNB and the SeNB. Meanwhile, the user terminal may determine that the dual connectivity mode is the split bearer mode or the non-split bearer mode. For example, as illustrated in FIG. 14, by performing the process 1700, the connection between the vehicle terminal (i.e., the vehicle 1402) and the MeNB 1404 and the connection between the vehicle terminal and the secondary vehicle terminal (i.e., the vehicle 1420) may be established. The vehicle terminal may be in the dual connectivity mode with the MeNB 1404 and the secondary vehicle terminal.

It should be noted that the above description of the process 1700 for establishing the dual connectivity is merely provided for the purposes of illustration, and not intended to limit the scope of the present disclosure. For persons having ordinary skills in the art, multiple variations or modifications may be made on the process 1800 under the teachings of the present disclosure. However, those variations and modifications do not depart from the scope of the present disclosure.

Figure 18:
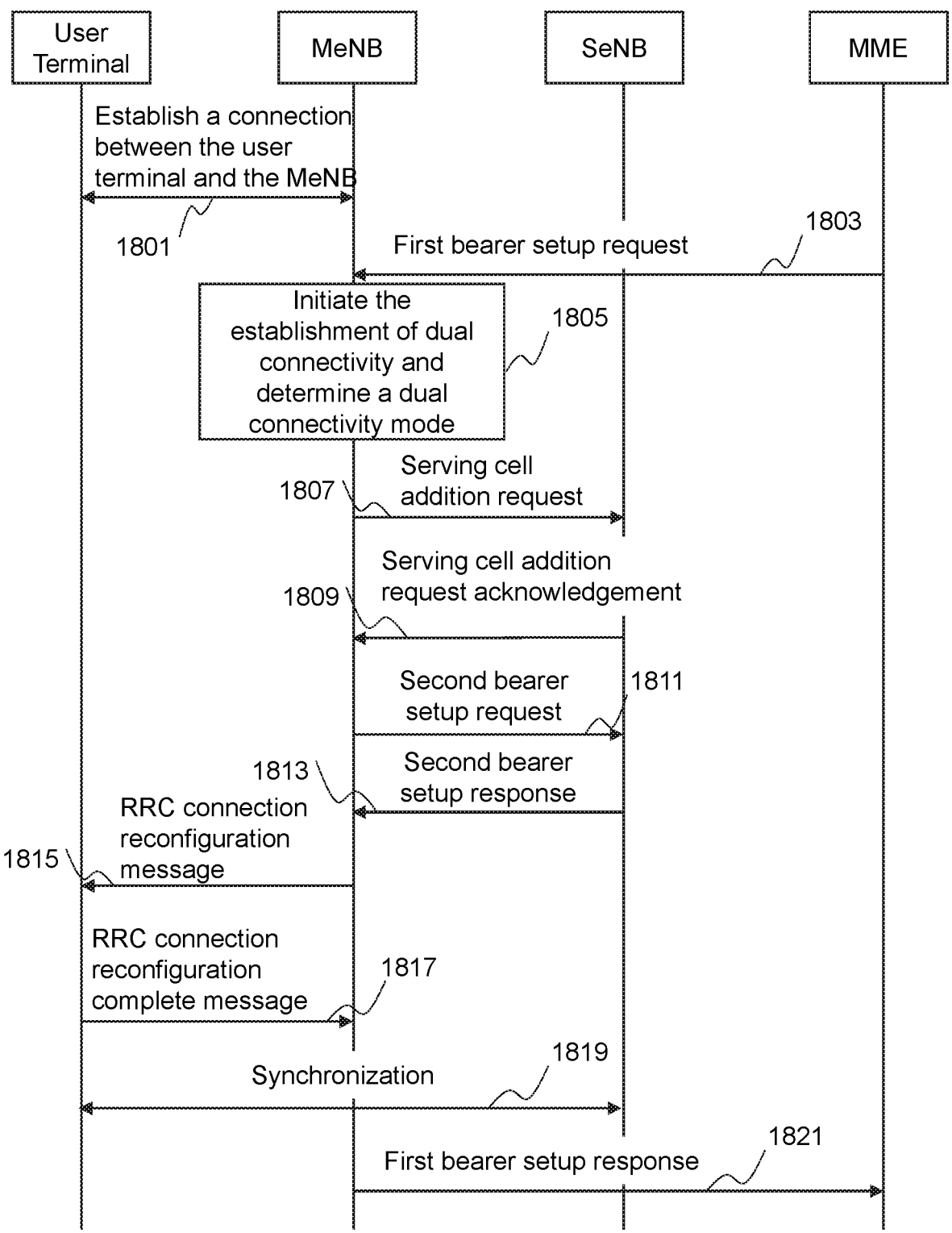
FIG. 18 is a schematic diagram illustrating an exemplary process for establishing dual connectivity according to some embodiments of the present disclosure.

FIG. 18 is a schematic diagram illustrating an exemplary process 1800 for establishing dual connectivity according to in some embodiments of the present disclosure. The process 1800 may be executed by the LTE system 100. In the process 1800, an MeNB is triggered by an MME to initiate the establishment of the dual connectivity. The method 1800 may be an implementation of the process 1700 in FIG. 17.

In 1801, a user terminal (e.g., the user terminal 110) may establish a connection with the MeNB. A radio bearer between the MeNB and the user terminal may be established. In some embodiments, the user terminal may establish the connection with the MeNB through a random access process. For example, operation 1801 may be implemented by performing the process 1600 in FIG. 16.

In 1803, the MME may transmit a first bearer setup request to the MeNB. The first bearer setup request may instruct to establish a bearer between the MeNB and the MME.

After receiving the first bearer setup request, the MeNB may firstly establish a bearer with the SeNB. In 1805, the MeNB may be triggered by the first bearer setup request to initiate the establishment of the dual connectivity and determine a dual connectivity mode. The MeNB may determine the dual connectivity mode based on various factors. In some embodiments, the MeNB may determine the dual connectivity mode based on a local configuration of the MeNB. For example, if the local configuration of the MeNB restricts the data forwarding of the MeNB, the MeNB may determine that the dual connectivity mode is the non-split bearer mode; if the local configuration of the MeNB indicates that the MeNB has a capability of data forwarding, the MeNB may determine that the dual connectivity mode is the split bearer mode. In some embodiments, the MeNB may determine the dual connectivity mode based on factors such as load status, service quality, and channel quality of the MeNB and/or the SeNB.

In 1807, the MeNB may transmit a serving cell addition request to the SeNB. The serving cell addition request may instruct the SeNB to add a serving cell. The bearer between the MeNB and the SeNB may be established in the added serving cell.

The SeNB may perform a radio resource configuration and provide a servicing cell for establishing the bearer between the MeNB and the SeNB based on the service cell addition request. When the SeNB completes the radio resource configuration, in 1809, the SeNB may transmit a serving cell addition request acknowledgement to the MeNB.

In 1811, the MeNB may transmit a second bearer setup request to the SeNB. The second bearer setup request may instruct to establish the bearer between the MeNB and the SeNB. The bearer between the MeNB and the SeNB may be established in the added serving cell. In some embodiments, the second bearer setup request may include an uplink tunnel endpoint. If the dual connectivity mode is the split bearer mode, the uplink tunnel endpoint is the MeNB. If the dual connectivity mode is the non-split bearer mode, the uplink tunnel endpoint is an S-GW. The SeNB may determine the dual connectivity mode based on the uplink tunnel endpoint in the second bearer setup request. If the uplink tunnel endpoint is the MeNB, the SeNB may determine that the dual connectivity mode is the split bearer mode; if the uplink tunnel endpoint is the S-GW, the SeNB may determine that the dual connectivity mode is the non-split bearer mode.

In some embodiments, the second bearer setup request may also include configuration suggestions of an access layer (e.g., a configuration of an MAC layer, a configuration of a physical layer, a configuration of an RLC layer, a logical channel configuration, a configuration of a PDCP layer, etc.) of the MeNB. The SeNB may perform a configuration operation based on the second bearer setup request. In some embodiments, the configuration operation may include configuring the access layer of the SeNB based on the configuration suggestions of the access layer of the MeNB.

After completing the configuration, in 1813, the SeNB may transmit a second bearer setup response to the MeNB. The second bearer setup response may indicate that the establishment of the bearer between the SeNB and the MeNB has been completed.

In 1815, the MeNB may transmit an RRC connection reconfiguration message to the user terminal. The RRC connection reconfiguration message may instruct the user terminal to perform a connection reconfiguration operation to achieve the dual connectivity mode of the user terminal with the MeNB and the SeNB. The RRC connection reconfiguration message may include configuration information of the MeNB and/or configuration information of the SeNB. In some embodiments, the configuration information of the MeNB may include a configuration of a PDCP layer, an EPS-bearer identifier, a DRB identifier, a configuration of an RLC layer, a logical channel identifier and a logical channel configuration, or the like, or any combination thereof. In some embodiments, the configuration information of the SeNB may include a cell index, a cell identifier, a configuration of an RLC layer, a logical channel identifier and a logical channel configuration, a configuration of a PDCP layer, an EPS-bearer identifier, a DRB identifier, or the like, or any combination thereof. The user terminal may determine the dual connectivity mode of the user terminal based on the RRC connection reconfiguration message. In some embodiments, if the configuration information of the SeNB in the RRC connection reconfiguration message includes at least one of the configuration of the PDCP layer, the EPS-bearer identifier, and the DRB identifier, the user terminal may determine that the dual connectivity mode is the non-split bearer mode. If the configuration information of the SeNB in the RRC connection reconfiguration message does not include the configuration of the PDCP layer, the EPS-bearer identifier, or the DRB identifier, the user terminal may determine that the dual connectivity mode is the split bearer mode.

After the user terminal completes the connection reconfiguration operation, in 1817, the user terminal may transmit an RRC connection reconfiguration complete message to the MeNB.

In 1819, the user terminal may synchronize with the SeNB by performing a random access process.

In 1821, in response to the first bearer setup request, the MeNB may transmit a first bearer setup response to the MME. The first bearer setup response may indicate that the establishment of the bearer between the MeNB and the MME has been completed.

In the process 1800, the MeNB firstly establishes the bearer with the SeNB, and then in the process of establishing the bearer between the MeNB and the MME, the MeNB instructs the user terminal to perform the connection reconfiguration operation to achieve the dual connectivity. It should be noted that the MeNB may also perform the above operations in the other order, which is not limiting. The MeNB and the SeNB may be examples (or embodiments) of the eNB 121 (as illustrated in FIG. 1).

By performing the process 1800, the user terminal may establish connections with the MeNB and the SeNB, respectively, i.e., the user terminal may be in the dual connectivity mode with the MeNB and the SeNB. For example, taking FIG. 14 as an example, by performing the process 1800, the vehicle terminal (i.e., the vehicle 1402) may establish the connections with the MeNB 1404 and the secondary vehicle terminal (i.e., the vehicle 1420), respectively. The vehicle terminal may be in the dual connectivity mode with the MeNB 1404 and the secondary vehicle terminal.

It should be noted that the above description of the process 1800 for establishing the dual connectivity is merely provided for the purposes of illustration, and not intended to limit the scope of the present disclosure. For persons having ordinary skills in the art, multiple variations or modifications may be made on the process 1800 under the teachings of the present disclosure. However, those variations and modifications do not depart from the scope of the present disclosure. In some embodiments, the order of operation 1817 and operation 1819 may be interchanged.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for a handover, comprising:
   at least one storage device storing a set of instructions; and
   at least one processor in communication with the at least one storage device, wherein when executing the set of instructions, the at least one processor is configured to cause the system to:
      establish a connection between a vehicle terminal and a first macro evolved Node B (MeNB) and a connection between the vehicle terminal and a secondary evolved Node B (SeNB), the vehicle terminal being in a dual connectivity mode with the first MeNB and the SeNB;
      receive a handover command from the first MeNB; and
      disconnect, based on the handover command, the vehicle terminal from the first MeNB and establish synchronization between the vehicle terminal and a second MeNB, wherein the connection between the vehicle terminal and the SeNB is maintained,
      wherein the SeNB is a secondary vehicle terminal meeting a preset condition or an SeNB installed at a fixed location.

2. The system of claim 1, wherein the preset condition includes at least one of:
   a distance between the secondary vehicle terminal and the vehicle terminal being not greater than a first preset threshold within a time interval;
   a relative speed between the secondary vehicle terminal and the vehicle terminal being within a speed range within a time interval; or
   an overlapping degree between a driving route of the secondary vehicle terminal and a driving route of the vehicle terminal being not less than a second preset threshold within a time interval.

3. The system of claim 2, wherein the at least one processor is further configured to cause the system to:
   determine, based on historical data of the vehicle terminal and historical data of the secondary vehicle terminal, the secondary vehicle terminal as the SeNB that meets the preset condition.

4. The system of claim 1, wherein to receive the handover command from the first MeNB, the at least one processor is configured to cause the system to:

transmit a measurement report to the first MeNB, wherein:
the measurement report includes a strength of signals received by the vehicle terminal from the first MeNB or a strength of signals received by the vehicle terminal from the second MeNB; and
the first MeNB determines, based on the measurement report, that the vehicle terminal is moving from a first cell coverage area corresponding to the first MeNB to a second cell coverage area corresponding to the second MeNB, and generates a handover decision; and
in response to the handover decision, receive the handover command from the first MeNB.

5. The system of claim 1, wherein to receive the handover command from the first MeNB, the at least one processor is configured to cause the system to:
receive the handover command in a radio resource control (RRC) message.

6. The system of claim 5, wherein the RRC message includes a first RRC connection reconfiguration message.

7. The system of claim 6, wherein the at least one processor is further configured to cause the system to:
transmit, based on the first RRC connection reconfiguration message, a first RRC connection reconfiguration complete message to the second MeNB.

8. The system of claim 1, wherein the dual connectivity mode includes a split bearer mode or a non-split bearer mode.

9. The system of claim 8, wherein the dual connectivity mode is based on a dual connectivity establishment process, and during the dual connectivity establishment process, the at least one processor is configured to cause the system to:
receive a second RRC connection reconfiguration message from the first MeNB, wherein the second RRC connection reconfiguration message includes configuration information of the first MeNB, configuration information of the SeNB or both configuration information of the first MeNB and configuration information of the SeNB; and
determine, based on the second RRC connection reconfiguration message, that the dual connectivity mode is the split bearer mode or the non-split bearer mode.

10. A method for a handover, comprising:
establishing a connection between a vehicle terminal and a first macro evolved Node B (MeNB) and a connection between the vehicle terminal and a secondary evolved Node B (SeNB), the vehicle terminal being in a dual connectivity mode with the first MeNB and the SeNB;
receiving, by the vehicle terminal, a handover command from the first MeNB; and
disconnecting, based on the handover command, the vehicle terminal from the first MeNB and establishing synchronization between the vehicle terminal and a second MeNB, wherein the connection between the vehicle terminal and the SeNB is maintained,
wherein the SeNB is a secondary vehicle terminal meeting a preset condition or an SeNB installed at a fixed location.

11. The method of claim 10, wherein the preset condition includes at least one of:
a distance between the secondary vehicle terminal and the vehicle terminal being not greater than a first preset threshold within a time interval;
a relative speed between the secondary vehicle terminal and the vehicle terminal being within a speed range within a time interval; or an overlapping degree between a driving route of the secondary vehicle terminal and a driving route of the vehicle terminal being not less than a second preset threshold within a time interval.

12. The method of claim 11, further comprising:
determining, based on historical data of the vehicle terminal and historical data of the secondary vehicle terminal, the secondary vehicle terminal as the SeNB that meets the preset condition.

13. The method of claim 10, wherein receiving the handover command from the first MeNB includes:
transmitting a measurement report to the first MeNB, wherein:
the measurement report includes a strength of signals received by the vehicle terminal from the first MeNB or a strength of signals received by the vehicle terminal from the second MeNB; and
the first MeNB determines, based on the measurement report, that the vehicle terminal is moving from a first cell coverage area corresponding to the first MeNB to a second cell coverage area corresponding to the second MeNB, and generates a handover decision; and
in response to the handover decision, receiving the handover command from the first MeNB.

14. The method of claim 10, wherein receiving the handover command from the first MeNB includes:
receiving the handover command in a radio resource control (RRC) message.

15. The method of claim 14, wherein the RRC message includes a first RRC connection reconfiguration message.

16. The method of claim 15, further comprising:
transmitting, based on the first RRC connection reconfiguration message, a first RRC connection reconfiguration complete message to the second MeNB.

17. The method of claim 10, wherein the dual connectivity mode includes a split bearer mode or a non-split bearer mode.

18. The method of claim 17, wherein the dual connectivity mode is based on a dual connectivity establishment process, and the dual connectivity establishment process includes:
receiving a second RRC connection reconfiguration message from the first MeNB, wherein the second RRC connection reconfiguration message includes configuration information of the first MeNB, configuration information of the SeNB or both configuration information of the first MeNB and configuration information of the SeNB; and
determining, based on the second RRC connection reconfiguration message, that the dual connectivity mode is the split bearer mode or the non-split bearer mode.

19. A system for a handover, comprising a radio transceiver and a processor, wherein:
the radio transceiver is configured to receive a handover command from a first macro evolved Node B (MeNB); and
the processor is configured to:
establish a connection between a vehicle terminal and the first MeNB and a connection between the vehicle terminal and a secondary evolved Node B (SeNB), the vehicle terminal being in a dual connectivity mode with the first MeNB and the SeNB;
disconnect, based on the handover command, the vehicle terminal from the first MeNB and establish synchronization between the vehicle terminal and a second MeNB, wherein the connection between the vehicle terminal and the SeNB is maintained, wherein the SeNB is a secondary vehicle terminal meeting a preset condition or an SeNB installed at a fixed location.

20. The system of claim 19, wherein the preset condition includes at least one of:
 a distance between the secondary vehicle terminal and the vehicle terminal being not greater than a first preset threshold within a time interval;
 a relative speed between the secondary vehicle terminal and the vehicle terminal being within a speed range within a time interval; or
 an overlapping degree between a driving route of the secondary vehicle terminal and a driving route of the vehicle terminal being not less than a second preset threshold within a time interval.

* * * * *